United States Patent
Ostrowski et al.

(10) Patent No.: US 12,134,301 B2
(45) Date of Patent: *Nov. 5, 2024

(54) GROUP IDENTITY-DRIVEN SYSTEM AND METHOD FOR ADJUSTMENT OF CABIN COMFORT SETTING

(71) Applicant: Ford Global Technologies, LLC, Dearborn, MI (US)

(72) Inventors: David Alfred Ostrowski, Northville, MI (US); Akshay Dirisala, Olmsted Township, OH (US); Leopoldo Urbina, Álvaro Obregón (MX); Raghavendran Shankar, Windsor (CA); Elizabeth Anne Manwell, Canton, MI (US); Victoria Leigh Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 412 days.

This patent is subject to a terminal disclaimer.

(21) Appl. No.: 17/504,864

(22) Filed: Oct. 19, 2021

(65) Prior Publication Data
US 2023/0122813 A1    Apr. 20, 2023

(51) Int. Cl.
*B60H 1/00*    (2006.01)
(52) U.S. Cl.
CPC ..... *B60H 1/00742* (2013.01); *B60H 1/00828* (2013.01); *B60H 1/00878* (2013.01); *B60H 1/00964* (2013.01)

(58) Field of Classification Search
CPC ........... B60H 1/00742; B60H 1/00828; B60H 1/00878; B60H 1/00964; B60H 2001/00733; B60H 1/00771; B60H 1/00971
See application file for complete search history.

(56) References Cited

U.S. PATENT DOCUMENTS

| | | | |
|---|---|---|---|
| 9,159,232 B2 | 10/2015 | Ricci | |
| 9,242,619 B2 | 1/2016 | Choi | |
| 10,275,959 B2 | 4/2019 | Ricci | |
| 10,974,567 B2 | 4/2021 | Ostrowski et al. | |
| 2017/0349027 A1 | 12/2017 | Goldman-Shenhar et al. | |
| 2018/0203443 A1* | 7/2018 | Newman | B60L 1/00 |
| 2018/0232770 A1* | 8/2018 | Miller | G06Q 30/0266 |
| 2020/0031195 A1* | 1/2020 | Woods | B60H 1/00771 |
| 2020/0094651 A1* | 3/2020 | Ostrowski | G06N 20/00 |
| 2021/0133292 A1 | 5/2021 | Ostrowski et al. | |

FOREIGN PATENT DOCUMENTS

| | | |
|---|---|---|
| CN | 105365707 B | 3/2016 |
| EP | 3218264 B1 | 7/2018 |

* cited by examiner

*Primary Examiner* — Anne Marie Antonucci
*Assistant Examiner* — Lidia Kwiatkowska
(74) *Attorney, Agent, or Firm* — Vichit Chea; Price Heneveld LLP

(57) ABSTRACT

Systems and methods are disclosed for supporting and executing automated control of climate comfort settings based on user classification within a group identity database. Methods of generating and employing the group identity database are also disclosed.

14 Claims, 16 Drawing Sheets

GROUP IDENTITY-DRIVEN SYSTEM AND METHOD FOR ADJUSTMENT OF CABIN COMFORT SETTING

FIELD OF THE DISCLOSURE

The present disclosure generally relates to a vehicle. More specifically, the present disclosure relates to climate comfort within a vehicle.

BACKGROUND OF THE INVENTION

Vehicles often include climate comfort settings. The climate comfort settings can include a temperature of air delivered to a cabin of a vehicle and a velocity of air delivered to the cabin of the vehicle.

SUMMARY OF THE INVENTION

According to a first aspect of the present invention, a method for adjusting a cabin comfort setting of a vehicle includes receiving demographic information of a user, referencing a group identity database, wherein the group identity database includes demographic information from a user pool, grouping the user with an aligned cohort from the user pool based upon the demographic information of the user, determining a climate control set-point based upon data from the aligned cohort, and communicating an instruction to adjust at least one setting chosen from a temperature of air delivered to a cabin of the vehicle and a velocity of air delivered to the cabin of the vehicle.

Embodiments of the first aspect of the invention can include any one or a combination of the following features:
- adjusting the at least one setting chosen from a temperature of air delivered to a cabin of the vehicle and a velocity of air delivered to the cabin of the vehicle to meet the determined climate control set-point;
- monitoring adjustments made to the climate control set-point made by the user following execution of the step of adjusting the at least one setting chosen from a temperature of air delivered to a cabin of the vehicle and a velocity of air delivered to the cabin of the vehicle to meet the determined climate control set-point;
- refining the aligned cohort in response to detecting an adjustment made to the climate control set-point by the user;
- updating the group identity database in response to detecting an adjustment made to the climate control set-point by the user;
- the aligned cohort and the user have at least one characteristic in common chosen from a number of passengers within the cabin, a number of rows of seats within the cabin, age, gender, and race;
- receiving geographic information of the user and referencing the group identity database, wherein the group identity database further includes geographic information from the user pool; and
- refining the aligned cohort based upon based upon the geographic information of the user.

According to a second aspect of the present disclosure, a method for adjusting a cabin comfort setting of a vehicle includes receiving geographic information of a user, referencing a group identity database, wherein the group identity database includes geographic information from a user pool, grouping the user with an aligned cohort from the user pool based upon the geographic information of the user, determining a climate control set-point based upon data from the aligned cohort, and communicating an instruction to adjust at least one setting chosen from a temperature of air delivered to a cabin of the vehicle and a velocity of air delivered to the cabin of the vehicle.

Embodiments of the second aspect of the present disclosure can include any one or a combination of the following features:
- adjusting the at least one setting chosen from a temperature of air delivered to a cabin of the vehicle and a velocity of air delivered to the cabin of the vehicle to meet the determined climate control set-point;
- monitoring adjustments made to the climate control set-point made by the user following execution of the step of adjusting the at least one setting chosen from a temperature of air delivered to a cabin of the vehicle and a velocity of air delivered to the cabin of the vehicle to meet the determined climate control set-point;
- refining the aligned cohort in response to detecting an adjustment made to the climate control set-point by the user;
- updating the group identity database in response to detecting an adjustment made to the climate control set-point by the user;
- receiving demographic information of the user and referencing the group identity database, wherein the group identity database further includes demographic information from the user pool;
- refining the aligned cohort based upon based upon the demographic information of the user; and
- the aligned cohort and the user have at least one characteristic in common chosen from a number of passengers within the cabin, a number of rows of seats within the cabin, age, gender, and race.

According to a third aspect of the present disclosure, a method for developing a group identity database includes receiving demographic information of a user, receiving geographic information of the user, monitoring adjustments made to a climate control system of a vehicle by the user, logging current environmental conditions exterior to the vehicle, and storing an adjustment made to the climate control system as an adjustment event, wherein the adjustment event is tagged with the demographic information of the user, the geographic information of the user, the current environmental conditions exterior to the vehicle, and an adjustment category, and wherein the adjustment category is a set-point of the climate control system.

Embodiments of the third aspect of the present disclosure can include any one or a combination of the following features:
- the set-point is at least one setting chosen from a temperature of air delivered to a cabin of the vehicle and a velocity of air delivered to the cabin of the vehicle;
- applying a machine learning model that is trained to evaluate demographic information and geographic information of a user pool and group the user with an aligned cohort of individuals from the user pool that have chosen similar settings of the climate control system in environmental conditions that are similar to the current environmental conditions exterior to the vehicle; and determining identifying characteristics of the aligned cohort and the user and establishing a group identity based upon the identifying characteristics.

These and other aspects, objects, and features of the present disclosure will be understood and appreciated by

DETAILED DESCRIPTION OF THE PREFERRED EMBODIMENTS

Figure 1:
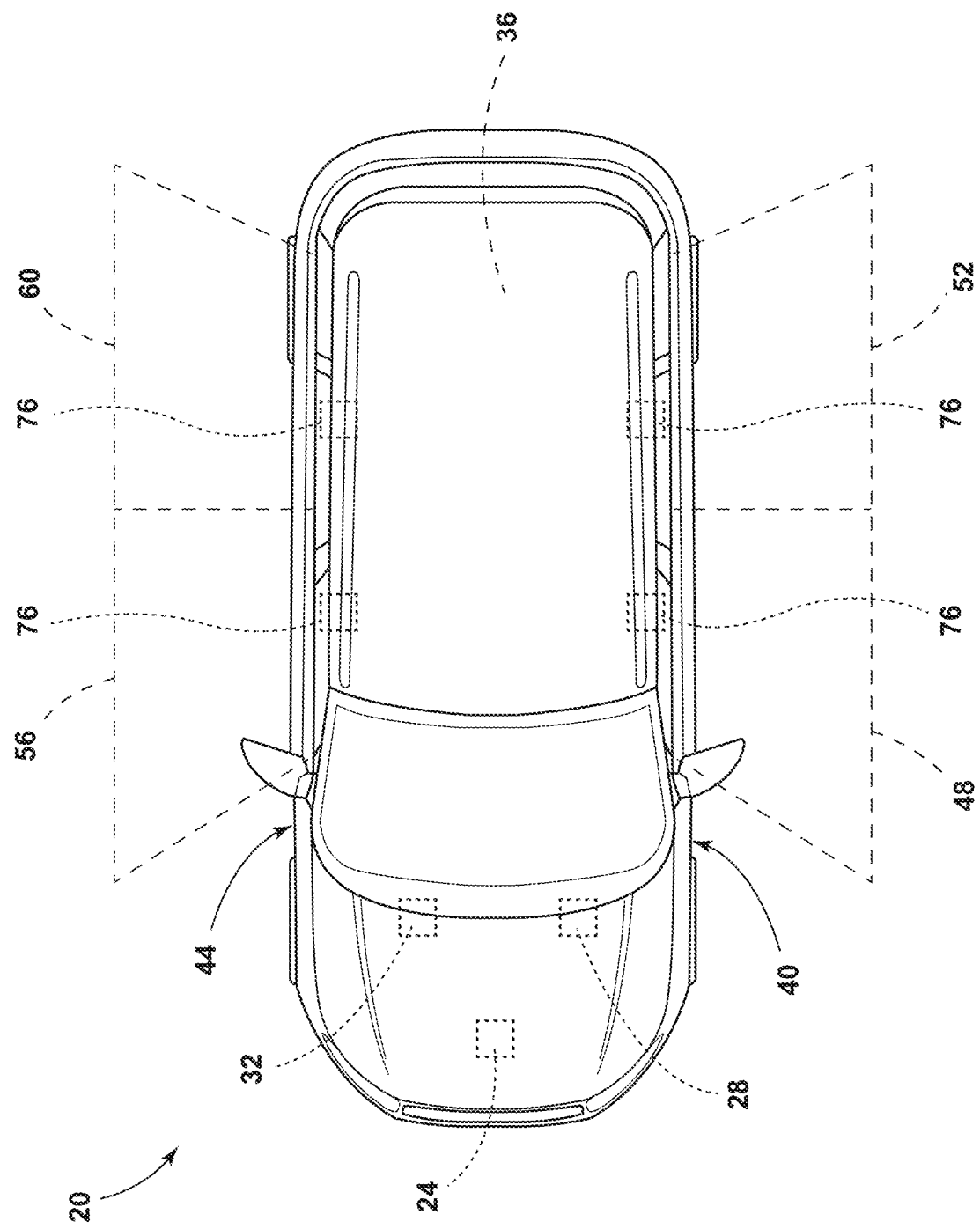
FIG. 1 is a top view of a vehicle, illustrating a plurality of entry point zones, according to one example.
Figure 2:
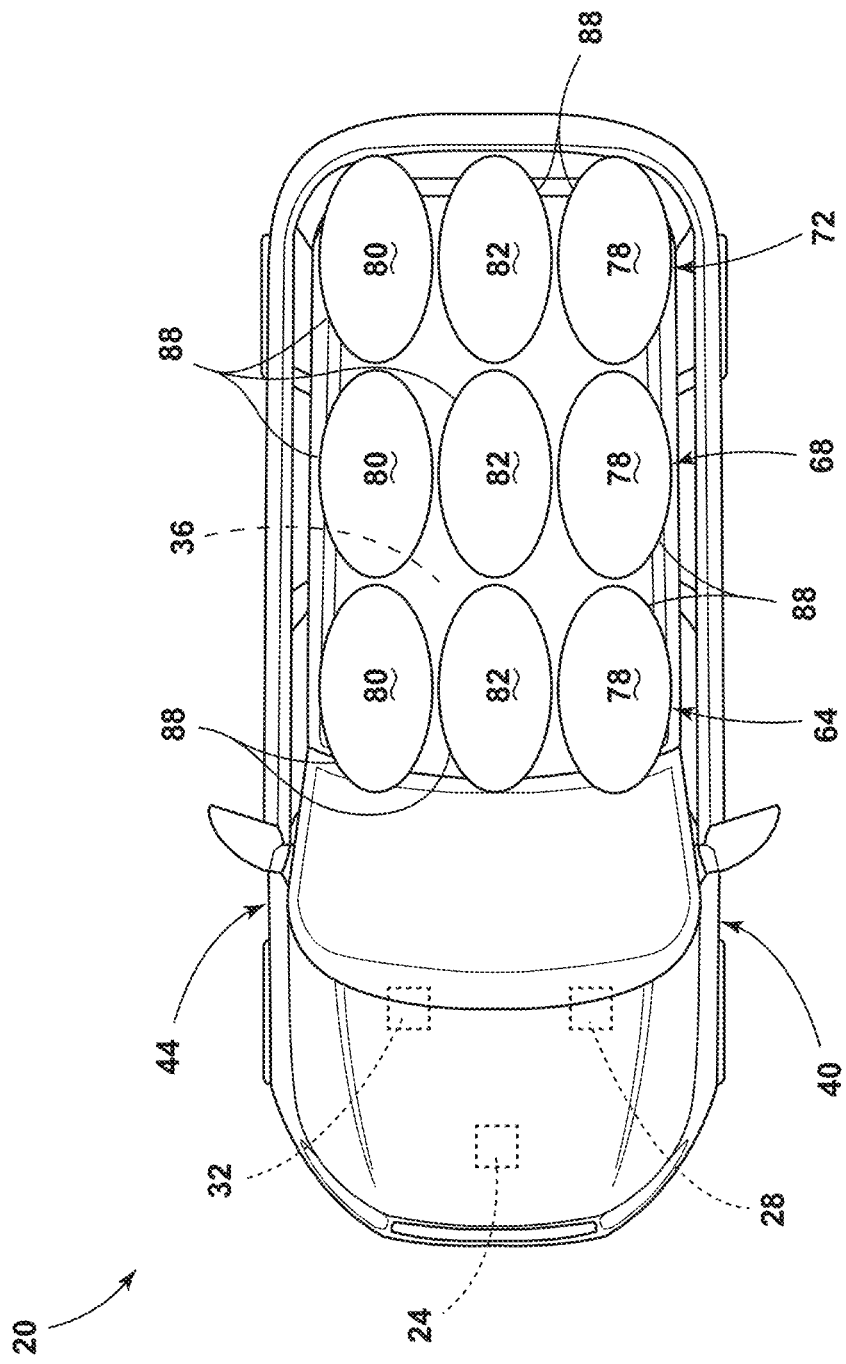
FIG. 2 is a top view of the vehicle, illustrating occupant zones, according to one example.
Figure 3:
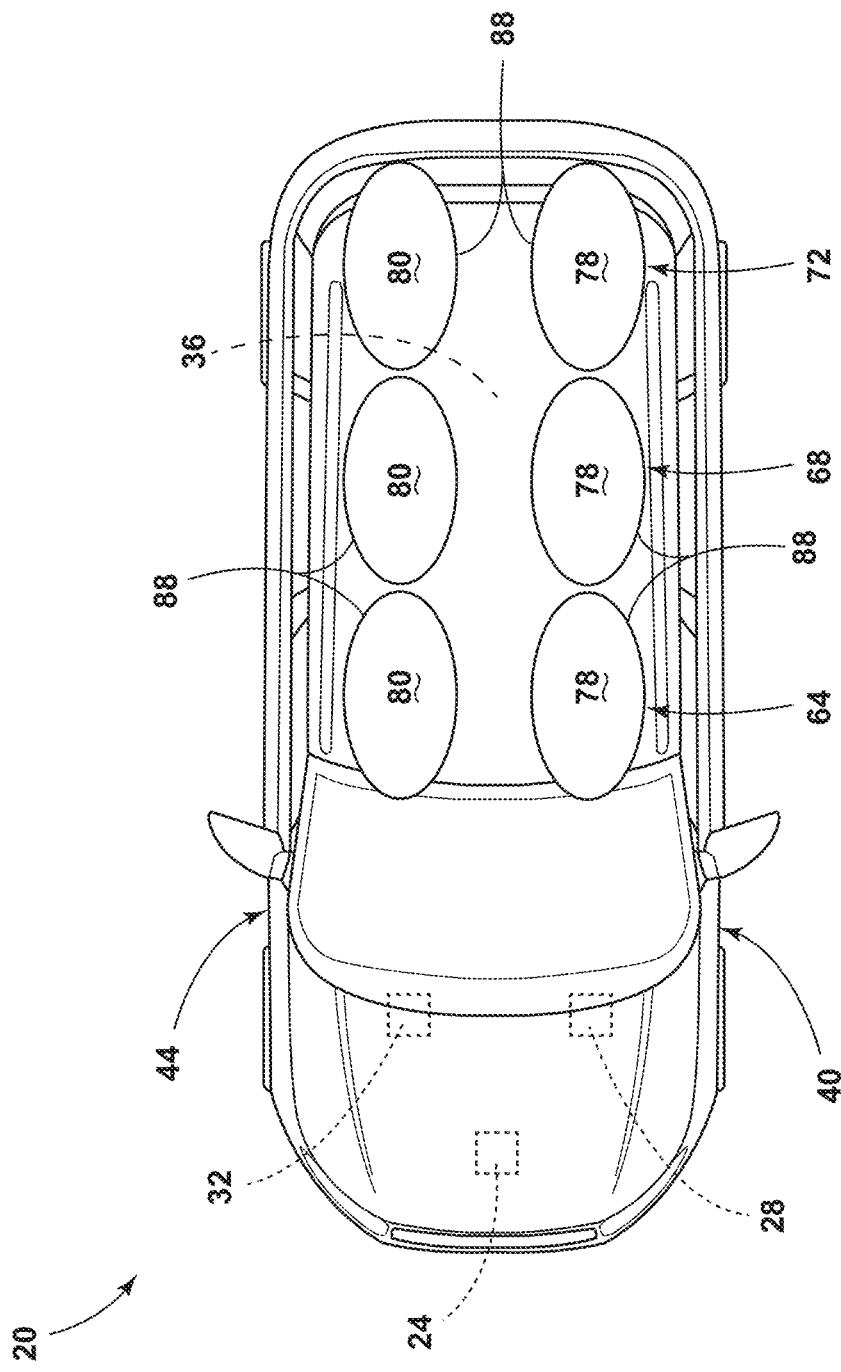
FIG. 3 is a top view of the vehicle, illustrating the occupant zones, according to another example.
Figure 4:
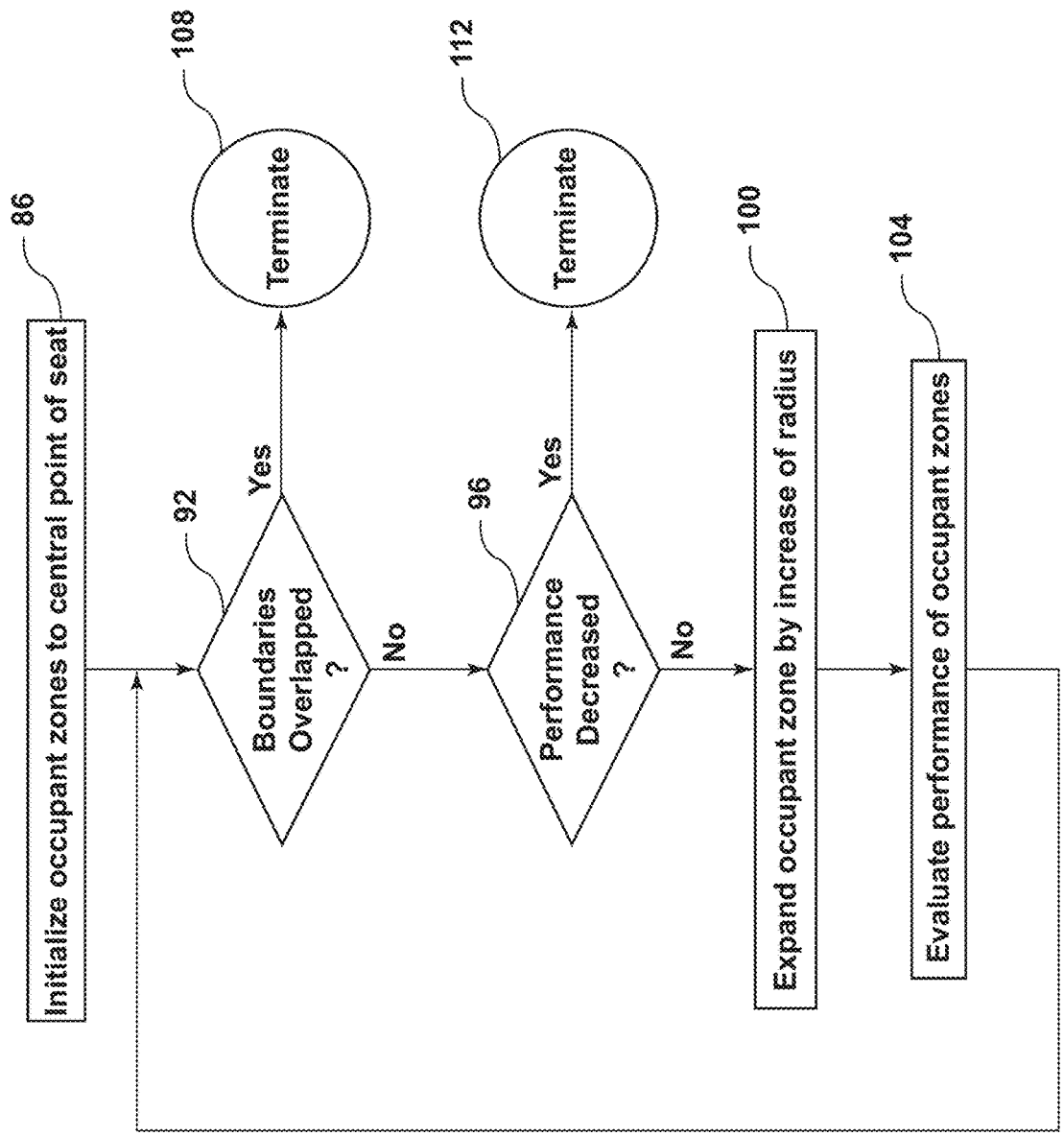
FIG. 4 is a flow diagram of a method of executing a trained model, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a climate comfort within a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-4, reference numeral 20 generally designates a vehicle. The vehicle 20 may be a motor vehicle. For example, the vehicle 20 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 20 may be a motor vehicle, the present disclosure is not limited to internal combustion engines as a source of locomotive power for the vehicle 20. Rather, alternative sources may be utilized in providing locomotive power to the vehicle 20. For example, locomotive power may be provided to the vehicle 20 by electric motors, fuel cells, and/or petroleum-based fuel engines. According to various examples, the vehicle 20 may be driver-controlled, semi-autonomous, fully-autonomous, or any combination of user-controlled and automated. For example, the semi-autonomous example of the vehicle 20 may perform many or all-commuting functions (e.g., accelerating, braking, turning, signaling, etc.) independent of user interaction while the user maintains override control of the vehicle 20.

Referring again to FIGS. 1-4, the vehicle 20 includes a climate control system 24 and a vehicle-based controller 28. The vehicle-based controller 28 can include a processor and memory. The memory can store software routines that are executable by the processor. In various situations, some of which will be discussed further herein, the software routines within the memory may be accessed by the vehicle-based controller 28 and/or the processor in response to an input (e.g., from the vehicle 20 and/or the user). The vehicle-based controller 28 is coupled to the vehicle 20 such that the vehicle-based controller 28 is moved through space as the vehicle 20 moves through space. Said another way, the vehicle-based controller 28 is carried by the vehicle 20. The vehicle 20 may be provided with a Global Positioning System (GPS) 32. In various examples, the climate control system 24 adjusts, at least, a temperature of air delivered to a cabin 36 of the vehicle 20 and a velocity of air delivered to the cabin 36 of the vehicle 20. For example, the climate control system 24 can adjust the temperature of air that is delivered to the cabin 36 by employing a heat pump 38 (see FIG. 5). In such an example, air may be directed to the cabin 36 from an environment that is exterior to the vehicle 20 and the heat pump 38 can heat the air from the exterior environment when a user or occupant requests a temperature of the cabin 36 that is greater than the temperature of the exterior environment. Similarly, the heat pump 38 can cool the air from the exterior environment when the user or occupant requests a temperature of the cabin 36 that is less than the temperature of the exterior environment.

Referring further to FIGS. 1-4, in some examples, the climate control system 24 can provide dehumidification of the air delivered to the cabin 36. Similar principles may apply when a recirculation function of the climate control system 24 is selected. In such examples, air may be pulled into ductwork of the climate control system 24 from the cabin 36 rather than from the exterior environment. Accordingly, the heat pump 38 can heat the air pulled from the cabin 36 when the user or occupant requests a temperature of the cabin 36 that is greater than a current temperature of the cabin 36. Similarly, the heat pump 38 can cool the air pulled from the cabin 36 when the user or occupant requests a temperature of the cabin 36 that is less than the current temperature of the cabin 36. As will be discussed in further detail herein, the present disclosure provides a variety of methods of controlling a cabin comfort setting of the cabin 36 of the vehicle 20.

Referring still further to FIGS. 1-4, the vehicle 20 can be provided with a plurality of entry points for passengers, users, or occupants. For example, at least one of the plurality of entry points can be positioned on a driver's side 40 of the vehicle 20. Similarly, at least one of the plurality of entry points can be positioned on a passenger's side 44 of the vehicle 20. While the terms "driver's side" and "passenger's side" are used to distinguish a first side of the vehicle 20 from a second side of the vehicle 20, these terms are not intended to be limiting. For example, when the vehicle 20 is fully-autonomous, conventional operator controls may be omitted from the cabin 36 such that an occupant seated on the driver's side 40 and in a forward-most row of the vehicle 20 may not be actively driving the vehicle 20. The driver's side 40 and the passenger's side 44 may each be provided with one or more access doors through which an occupant or occupants may enter or exit the cabin 36. The one or more access doors may be monitored to determine a point of entry for a given occupant and/or a number of occupants that have entered a given access door. For example, if the driver's side 40 and the passenger's side 44 are each provided with two access doors, then the driver's side 40 can be provided with a first entry point zone 48 and a second entry point zone 52 while the passenger's side 44 is provided with a third entry point zone 56 and a fourth entry point zone 60. The first and third entry point zones 48, 56 may be associated with a first row of seats 64 in the cabin 36. The second and fourth entry point zones 52, 60 may be associated with a second row of seats 68 and/or a third row of seats 72. The first, second, third, and fourth entry point zones 48, 52, 56, 60 may be monitored independently. For example, a monitoring device 76 may be positioned proximate to each of the access doors.

Referring yet again to FIGS. 1-4, identifying the point of entry of a given occupant or user can be beneficial in determining which row of seats the individual is likely to be occupying and/or which seating assembly within the rows of seats the individual is likely to be occupying. Additionally, or alternatively, identifying the point of entry of a given occupant or user can be employed as a cross-reference with additional data to determine a specific location of an individual user or occupant. For example, proximity sensors, RSSI antennae, weight sensors, seatbelt latch sensors, and the like may be employed within the cabin 36 to identify occupied seating assemblies. It is contemplated that the vehicle-based controller 28 may be provided with a configuration of the seating assemblies within the cabin 36 of the vehicle 20 and/or the vehicle-based controller 28 may be provided with a list of possible configurations of the seating assemblies within the cabin 36 of the vehicle 20. The information with regard to the configuration, or possible configurations, of the cabin 36 can aid in establishing a number of seating positions. For example, each of the rows of seats (e.g., the first row of seats 64, the second row of seats 68, and/or the third row of seats 72) may be provided with a first seat 78, a second seat 80, and/or a third seat 82.

Referring again to FIGS. 1-4, the first seat 78 may be positioned nearest to the driver's side 40 of the vehicle 20. The second seat 80 may be positioned nearest to the passenger's side 44 of the vehicle 20. The third seat 82 may be positioned between the first and second seats 78, 80, for example, as a middle seat. By "knowing" the available seating positions, the vehicle-based controller 28 may be better enabled to determine a location of a given occupant and/or distinguish between adjacent occupants. For example, the vehicle-based controller 28 may be capable of determining a number of personal devices (e.g., smartphones, smartwatches, or other wearable/carry-able smart-enabled technologies) within the cabin 36 by referencing one or more inputs from sensors of the vehicle 20. The location of a given one of the personal devices maybe determined, for example, by triangulation with RSSI antennae. The determined location of the given one of the personal devices may then be compared with the "known" seating positioned of the vehicle 20. In the event that the determined location of the given one of the personal devices does not reside within one of the "known" seating positions, additional steps may be taken in an effort to refine the determined location and/or the "known" seating positions.

Referring now to FIGS. 2-5, in determining a location of a given occupant, or occupant's personal device, a trained model may be employed. The trained model can be executed on the vehicle-based controller 28 and/or a controller that is in communication with the vehicle-based controller 28 (e.g., a controller on the user's personal device, a controller that is remote from the vehicle 20, a cloud-based controller, etc.). As a starting point, a method 84 of executing the trained model may begin with step 86 of initializing an occupant zone to a central point of each "known" seating position. The occupant zones can each have a boundary 88. Once the occupant zones have been initialized at each of the "known" seating positions, the method 84 advances to decision point 92, where the method 84 determines if adjacent ones of the boundaries 88 of the initialized occupant zones overlap with one another. If, at decision point 92, the method 84 determines that the boundaries 88 of adjacent initialized occupant zones do not overlap, then the method 84 advances to decision point 96. At decision point 96, the method 84 determines whether performance of locating the occupant, or the occupant's personal device, to a "known" seating position has decreased. For example, a distance between the occupant, or the occupant's personal device, and the boundaries 88 may be monitored. If the distance between the occupant, or the occupant's personal device, and the boundaries has decreased or stayed the same when compared to the initialized occupant zone, then decision point 96 would indicate that the performance of the locating of the occupant, or the occupant's device, to one of the "known" seating positions has not decreased.

Referring again to FIGS. 2-5, if the method 84 determines at decision point 96 that the performance of locating the occupant, or the occupant's personal device, to a "known" seating position has not decreased (i.e., improved or stayed the same), then the method 84 advances to step 100 of expanding the boundaries 88 of the occupant zones by increasing a radius of the boundaries 88. In examples where the boundaries 88 are defined by more than one axis (e.g., an ellipse with a major axis and a minor axis), then the axes may be increased sequentially or simultaneously. Similarly, the axes may be increased at varied rates. For example, the major axis may extend in a longitudinal direction (i.e., front-to-rear) of the vehicle 20 and may be increased at a faster rate than the minor axis, which may extend in a lateral direction (i.e., side-to-side) of the vehicle 20. In so doing, a surface area and/or volume covered by the boundaries 88 may be increased in a manner that decreases a chance of capturing an adjacent occupant or an adjacent occupant's personal device. Therefore, inaccurately assigning an occupant to a given "known" seating position may be more readily avoided. A performance of the locating of the occupant, or the occupant's device, to one of the "known" seating positions is evaluated at step 104. As with decision point 96, a distance between the occupant, or the occupant's personal device, and the boundaries 88 can be evaluated at step 104. Once the performance of the expanded boundaries 88 of the occupant zones have been evaluated at step 104, the method 84 can return to decision point 92 and repeat the method 84 in an iterative manner. The method 84 may be terminated at step 108 when the boundaries 88 have been determined to overlap at decision point 92 or at step 112 when the performance evaluated at decision point 96 has decreased. In the event that the boundaries 88 have been determined to overlap and/or the performance has decreased, the method 84 may revert back to the immediately preceding boundaries 88 to avoid such overlap and/or such a decrease in performance. Once the boundaries 88 of the occupant zones have been established and the occupant, or the occupant's personal device, has been located to one of the "known" seating positions, one or more comfort settings may be monitored for the individual in the given "known" seating position. The one or more comfort settings can include, but are not limited to, a velocity of air delivered to the cabin 36, a temperature of air delivered to the cabin 36, air source (i.e., fresh air vs. recirculated air), and the like.

Figure 5:
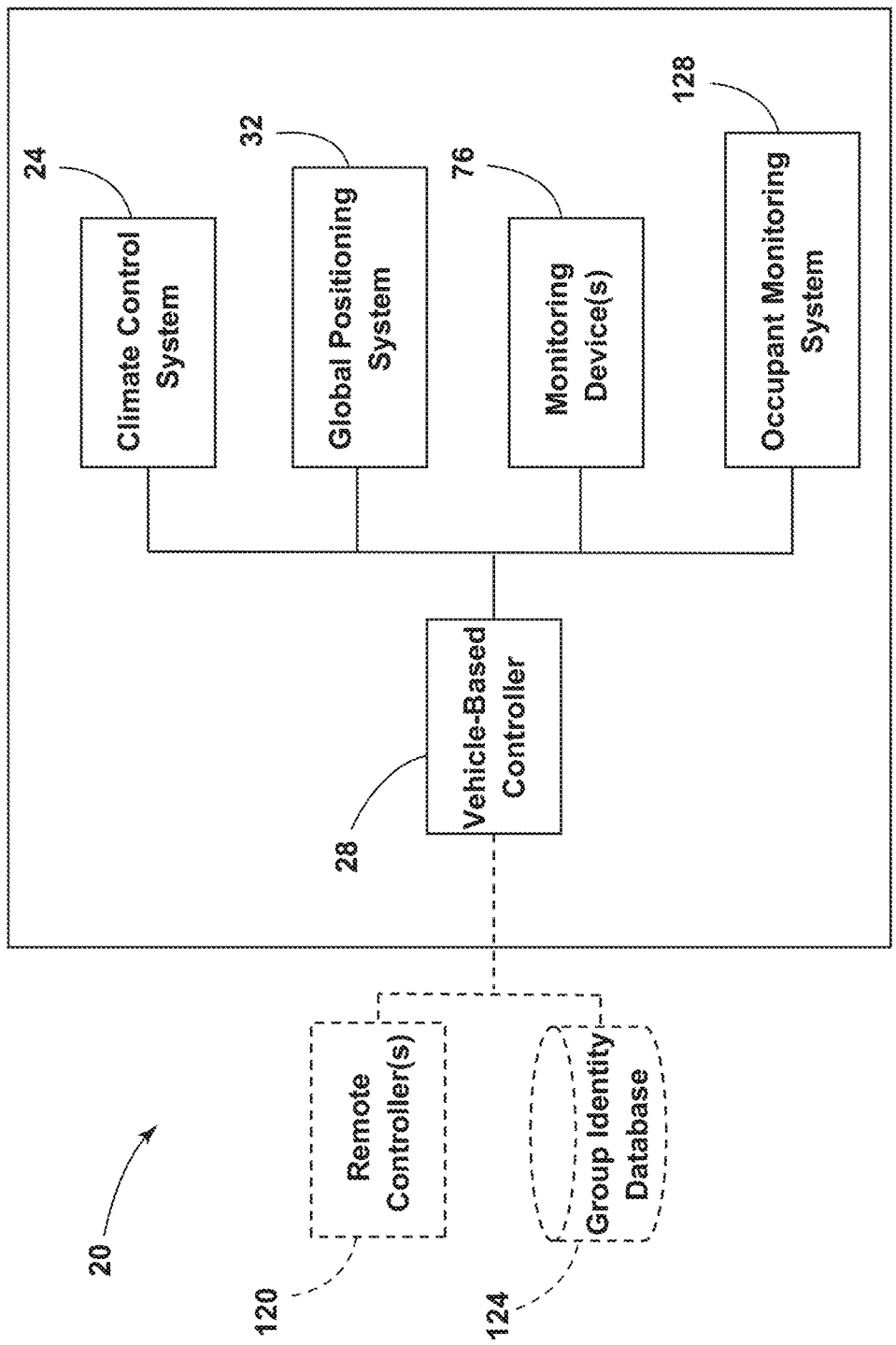
FIG. 5 is a schematic representation of the vehicle and components that are in communication with a vehicle-based controller.

Referring to FIG. 5, the vehicle 20 includes the vehicle-based controller 28. The vehicle-based controller 28 is in communication with the climate control system 24. The climate control system 24 can adjust climate-based comfort settings for the cabin 36 of the vehicle 20. The climate-based comfort settings can include, but are not limited to, the velocity of air delivered to the cabin 36, the temperature of air delivered to the cabin 36, the air source (i.e., fresh air vs. recirculated air), and the like. In various examples, the temperature of the air delivered to the cabin 36 can be adjusted by the heat pump 38 as briefly discussed above and as generally understood by one of skill in the art. The velocity of air delivered to the cabin 36 can be adjusted, for example, by adjusting a number of fans or blowers that are operating, adjusting a speed of the fans or blowers that are operating (e.g., adjusting a current and/or a voltage supplied to the fans or blowers), and/or adjusting features of the ductwork (e.g., an degree of openness for air outlet registers). The monitoring device(s) 76 are also in communication with the vehicle-based controller 28. Further, the vehicle-based controller 28 is in communication with the Global Positioning System (GPS) 32. In various examples, the vehicle-based controller 28 can be in communication with one or more remote controllers 120. The one or more remote controllers 120 can include a processor and memory. The memory can store software routines that are executable by the processor. In various situations, some of which will be discussed further herein, the software routines within the memory may be accessed by the one or more remote controllers 120 and/or the processor in response to an input (e.g., from the vehicle 20 and/or the user). The one or more remote controllers 120 can include, but are not limited to, a controller on the occupant's personal device (e.g., smartphone, smartwatch, etc.), a cloud-based controller, and/or a controller on a server at a location that is remote from (i.e., not on-board) the vehicle 20. The vehicle-based controller 28 is also in communication with a group identity database 124. The group identity database 124 may be stored within the vehicle-based controller 28 (e.g., within memory of the vehicle-based controller 28). Alternatively, the group identity database 124 may be stored at a location that is remote from the vehicle 20, such as on a remote computing device (e.g., computer, server, or the like).

Referring again to FIG. 5, the group identity database 124 can include information from a user pool. The user pool can include individuals, or groups of individuals, that have interacted with the vehicle 20 in the past, individuals, or groups of individuals, that have interacted with another vehicle that is equipped with the features discussed herein, historical datasets of individual preferences that were obtained by market research, individuals, or groups of individuals, who are actively using another vehicle that is equipped with the features discussed herein, and so on. The information stored in the group identity database 124 can include demographic information of individuals in the user pool, geographic information of individuals in the user pool, situational information of individuals in the user pool, and the like. The term situational information, as used herein, is intended to broadly refer to a variety of "if-then" scenarios. For example, the situational information of the individuals within the user pool can include information about environmental conditions exterior to the vehicle 20, information about environmental conditions within the cabin 36 of the vehicle 20, a temperature differential between the environment exterior to the vehicle 20 and the environment within the cabin 36, information about a number of passengers within the cabin 36, information about the identities of the passengers (e.g., a group of individuals that commonly travels together, familial relationship, etc.), information about a number of rows of seats within the cabin 36, a type of driving undertaken (e.g., city, highway, rural, straight sections of road, curved sections of road, etc.), an average speed of the vehicle 20 during use, an average time when the vehicle 20 is stopped (e.g., as a metric of idle time or a metric relating to traffic), an amount of time below a threshold speed, an amount of time above a threshold speed, and so on.

Referring further to FIG. 5, the vehicle-based controller 28 may additionally be in communication with an occupant monitoring system 128. The occupant monitoring system 128 can include a camera, a microphone, and/or the user's personal device. In general, the occupant monitoring system 128 seeks to observe the occupant or user in an effort to gauge or infer a degree of anxiety. For example, the camera may collect images of a face of the user and evaluate the images by employing image-based emotional mapping, as will be discussed in further detail herein. In some examples, Viola-Jones object detection framework can be employed in categorizing emotions of the user. The microphone may be used to monitor a voice of the user. For example, the microphone may monitor a tone in the voice of the user, words uttered by the user, and/or a volume (e.g., decibels) of the voice of the user. In examples where the user's personal device is capable of monitoring vital signs (e.g., EEG, EKG, heartrate, blood pressure), such as a smartwatch or smart wearable, such information can be employed as an input in gauging or inferring the degree of anxiety of the user.

Referring still further to FIG. 5, the information gathered by the occupant monitoring system 128 may be transmitted to the group identity database 124 for storage and/or classification. It is contemplated that the vehicle-based controller 28 and/or one or more of the remote controllers 120 may be employed in analyzing and/or classifying the information provided by the climate control system 24, the Global Positioning System (GPS) 32, the monitoring device(s) 76, and/or the occupant monitoring system 128. The group identity database 124 aggregates the information of the user pool and the user. The vehicle-based controller 28, the remote controller(s) 120, and/or the group identity database 124 can be provided with one or more trained models that evaluate behavior of the user or occupant of the vehicle 20 and seek to group the user with an aligned cohort from the user pool. Aligned cohort, as used herein, is intended to refer to a group of individuals from the user pool that behave, or have behaved, similarly to the user in a given circumstance or situation, as will be discussed further herein. The behavior of the aligned cohort can be employed to infer a desired cabin comfort setting, such as a climate comfort setting, for the user in a given circumstance or situation. In the event that the user departs from the inferred cabin comfort setting, the trained model(s) can update and/or refine the aligned cohort in an effort to decrease a probability of user deviation from the inferred cabin comfort setting.

Figure 6:
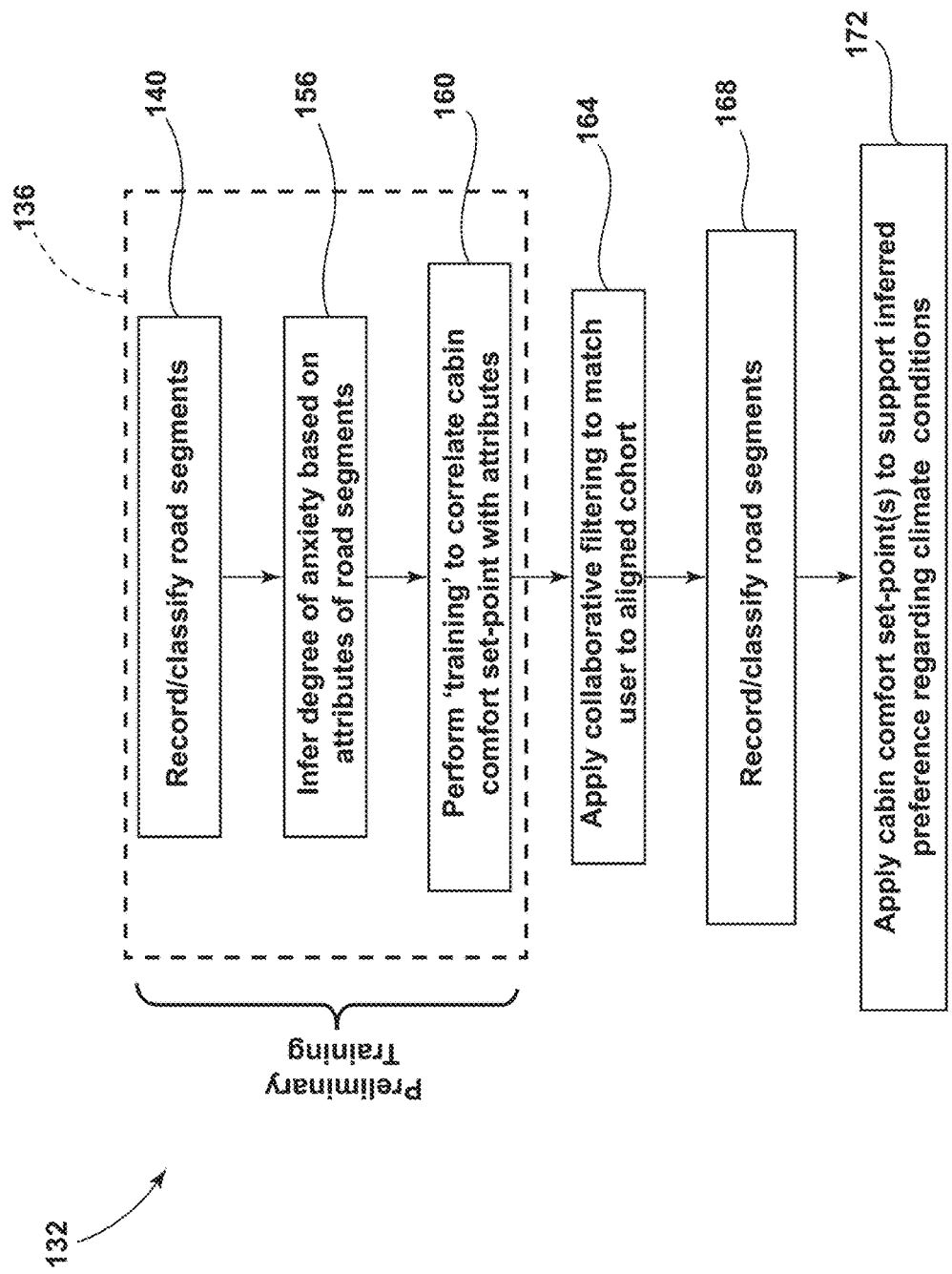
FIG. 6 is a flow diagram of a method for adjusting a cabin comfort setting, according to one example.
Figure 7:
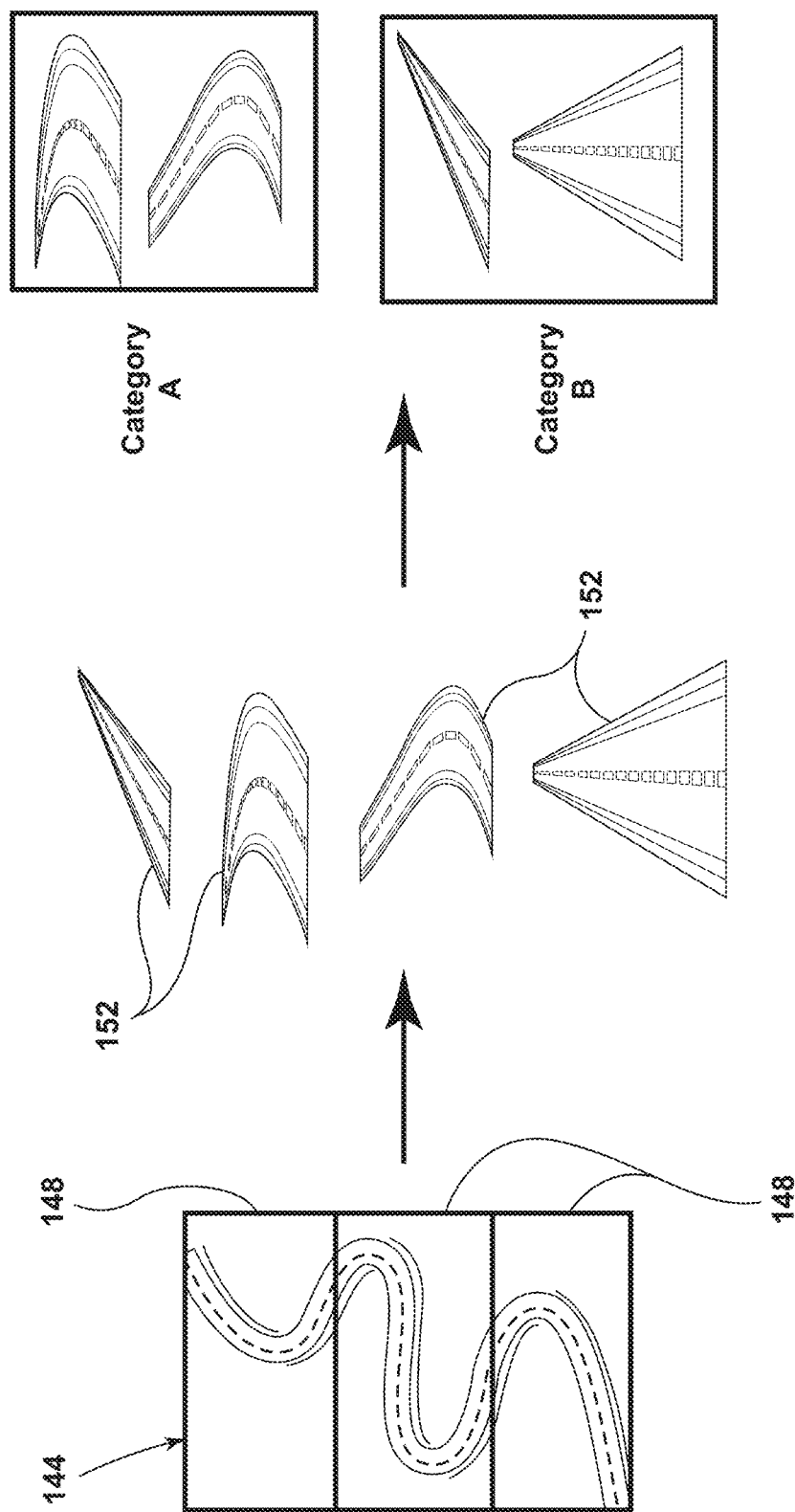
FIG. 7 is a flow diagram depicting a travel route being separated into road segments, according to one example.

Referring now to FIGS. 5-7, the Global Positioning System (GPS) 32 can be employed by the vehicle-based controller 28 and/or the remote controller(s) 120 to classify road segments along a planned travel route. Additionally, or alternatively, the Global Positioning System (GPS) 32 can be employed by the vehicle-based controller 28 and/or the remote controller(s) 120 to classify road segments along a current travel route. The planned travel route may be mapped between a current location of the vehicle 20 and an intended destination of the vehicle 20, which can be input by the user. The current travel route may be an active monitoring of driving conditions and/or driving maneuvers that are currently being executed when an intended destination is not input by the user. For example, the current travel route may be monitored by referencing a forward-facing camera on the vehicle 20, a speed of the vehicle 20, a rotational angle of steering components of the vehicle 20, and so on in an effort to infer attributes of the route. A method 132 for adjusting a cabin comfort setting is depicted according to one example (see FIG. 6). The method 132 can include a preliminary training stage 136. In the preliminary training stage 136, the method 132 executes step 140 of classifying road segments.

Referring again to FIGS. 5-7, the classification of road segments at step 140 can be accomplished in the active manner described above and/or by evaluating the planned travel route. The classified road segments can be classified based on the attributes of the road segment (e.g., curved road, straightaways, city, highway, rural, high traffic, low traffic, etc.). For example, as depicted in FIG. 7, a travel route 144 (planned or current) can be divided into road segments 148. The road segments 148 can be evaluated to determine their attributes 152. The attributes 152 can be categorized based on similarities in features and/or similarities in user responses to such attributes 152 (e.g., anxiety level, probability for highway hypnosis, etc.). For example, the attributes 152 may be placed in Category A if they are likely to result in increased anxiety and the attributes 152 may be placed in Category B if they are less likely to result in increased anxiety. In such an example, the likelihood of increased anxiety in Category A may also be categorized as less likely to result in highway hypnosis. Similarly, the lower likelihood of increased anxiety in Category B may also be categorized as more likely to result in highway hypnosis.

Referring further to FIGS. 5-7, once the road segments have been classified based on their attributes, the preliminary training stage 136 can advance to step 156 of inferring a degree of anxiety that is likely to be associated with such attributes. The inferred degree of anxiety can be informed by a dataset stored within the vehicle-based controller 28, the remote controller(s) 120, and/or the group identity database 124. The dataset used to inform the inferred degree of anxiety can include historical data from the user pool and/or market research data for a given attribute of the road segment(s). For example, the historical data from the user pool can include geographical tags that indicate a location of the vehicle when an adjustment was made to a cabin comfort setting. This geographical tag can be used to develop correlations between comfort preferences under various circumstances. The market research data can include information gleaned from user responses with regard to their experienced level of anxiety when encountering a given attribute of the road segment(s).

Referring still further to FIGS. 5-7, at step 160 of the method 132, the preliminary training stage 136 can perform a training to correlate cabin comfort set-points, such as climate comfort set-points, with the attributes 152 of the road segments 148 and/or the inferred degree of anxiety of the user. The training performed at step 160 can employ feedback from the user and/or the group identity database 124. For example, during the training of step 160, a climate comfort set-point may be adjusted by the vehicle-based controller 28 in response to one of the attributes 152 and/or the inferred degree of anxiety. If, in response to the climate comfort set-point adjustment by the vehicle-based controller 28, the user manually adjusts at least one setting of the climate control system 24, then the method 132 can adjust the preliminary training stage 136 to incorporate such feedback. The group identity database 124 can be updated with the same feedback. This feedback can be used to refine the method 132. The feedback, as well as the various forms of data that are discussed herein, can be tagged with identifying information for categorization within the group identity database. For example, such tags can include the demographic information of user, the geographic information of the user, the situational information of user, and the like.

Referring again to FIGS. 5-7, once the preliminary training stage 136 has been completed, or a degree of user deviation from the set-point adjusted by the vehicle-based controller 28 has decreased below a predetermined threshold, the method 132 can advance beyond the preliminary training stage 136 to step 164. At step 164, the method 132 applies collaborative filtering to match the user, or group of users, to an aligned cohort within the group identity database. For example, if the user is an adult male between the ages of eighteen and twenty-four that lives at or near a latitude that corresponds with the thirty-fifth parallel north (i.e., 35° N), then step 164 may seek to group the user with members of the user pool that have similar characteristics. With regard to collaborative filtering for a group of users, if the group of users is a group of four individuals that includes two adults and two minors (e.g., under the age of eighteen), where the four individuals live at or near a latitude that corresponds with the forty-fifth parallel north (i.e., 45° N), then the step 164 may seek to group the group of users with groups from the user pool that have similar characteristics. The foregoing examples of collaborative filtering are intended to be illustrative, not exhaustive or limiting.

Referring yet again to FIGS. 5-7, once the user or group of users has been grouped with an aligned cohort from the group identity database 124, the method 132 advances to step 168 of classifying road segments 148 along a travel route (planned or current) and grouping the attributes 152 of the road segments 148 with those categorized in the preliminary training stage 136 and/or with similar road segment 148 attributes 152 from a personal history of the user or a group history of the group of users. Once the road segments 148 have been classified and their attributes 152 evaluated, the method 132 can advance to step 172 of applying climate comfort set-point(s) that support an inferred preference with regard to climate conditions within the cabin 36. In inferring the preferred climate conditions, the method 132 may reference the personal history of the user or the group history of the group of users. Additionally, or alternatively, in inferring the preferred climate conditions, the method 132 may reference the occupant monitoring system 128 and aggregate current anxiety measurements of the user(s) and weight the climate condition options based on the current anxiety measurements. It is contemplated that the method 132 may take into account current environmental conditions exterior to the vehicle 20 (e.g., snow, ice, rain, etc.) in determining the preferred climate conditions. For example, when the current environmental conditions exterior to the vehicle 20 include snow and/or ice, the method 132 may prioritize a warmer temperature within the cabin 36 and/or a greater velocity of the air delivered to the cabin 36 in an effort to improve visibility (e.g., defog, deice, etc.). When the group of users is present in the vehicle 20, the method 132 may aggregate the current anxiety measurements of one or more of the individuals within the group of users and select, suggest, or infer the preferred climate conditions that are likely to lead to the lowest anxiety level for the entire group of users. It is contemplated that the individuals within the group of users may be given varying weights to their comfort and/or anxiety. For example, a driver may be given a greater weight than the remainder of the group, a spouse of the driver may be given a greater weight than the remainder of the group, infants may be given a greater weight than the remainder of the group, and so on.

Figure 8:
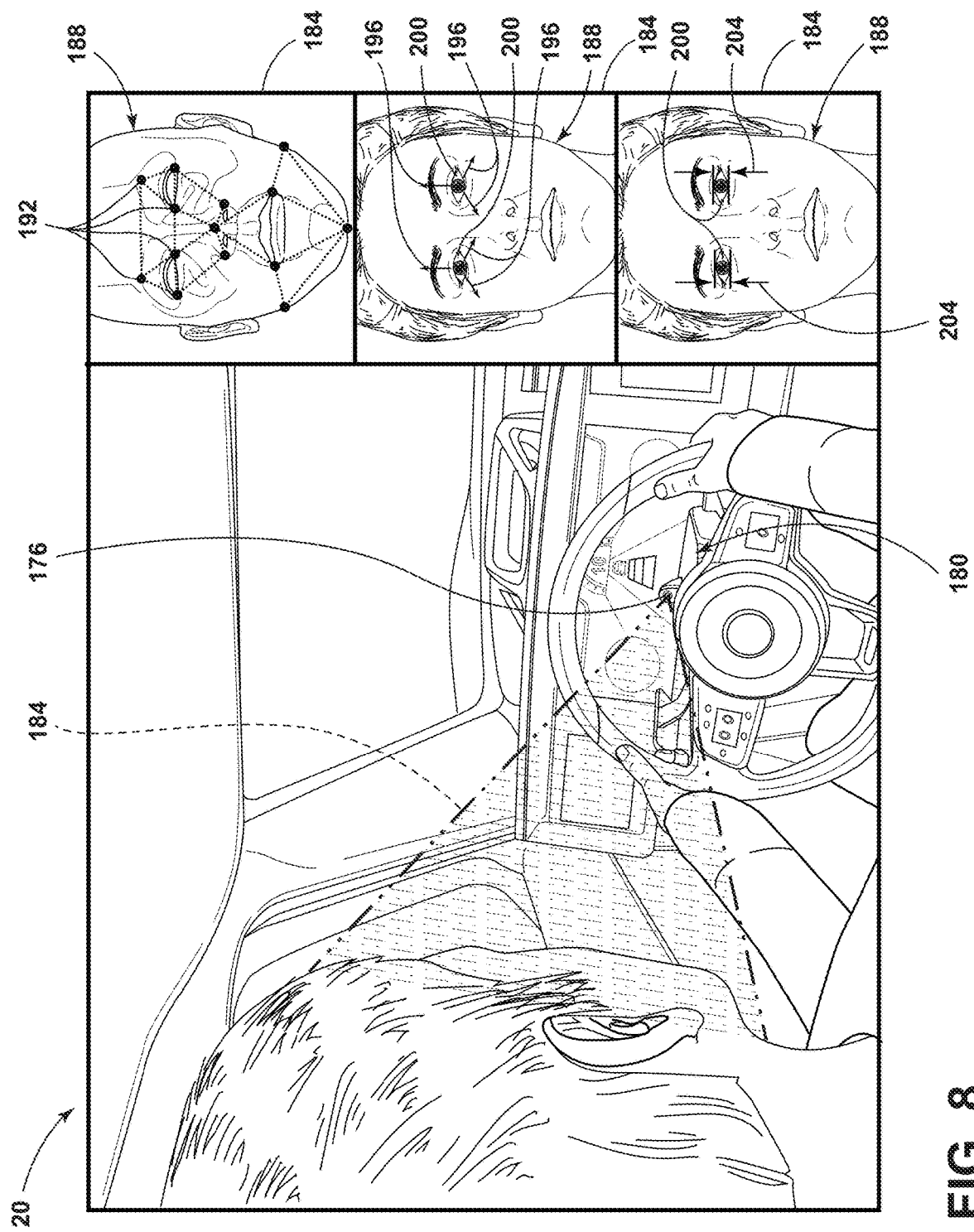
FIG. 8 is a rear perspective view of a cabin of the vehicle, illustrating a field-of-view of a cabin-facing camera, according to one example.

Referring now to FIG. 8, the vehicle 20 may be provided with a cabin-facing camera 176 as part of the occupant monitoring system 128. The cabin-facing camera 176 may be positioned on a steering assembly 180 of the vehicle 20 (e.g., a steering wheel, a cabin steering column shroud, etc.), on a personal mobile device of the user, or any other suitable location to monitor the user (e.g., a driver and/or a passenger). A field-of-view 184 of the cabin-facing camera 176 includes a face 188 of the user. The occupant monitoring system 128 can identify nodal points 192 on the face 188 of the user. The positioning of the nodal points 192 relative to one another, and changes thereof, can be employed in determining or inferring a current emotional state and/or anxiety level of the user. The occupant monitoring system 128 can also evaluate a direction of gaze 196 of eyes 200 of the user. The direction of gaze 196 of the eyes 200 of the user can be used to evaluate a degree of attention of the user. The occupant monitoring system 128 can further evaluate a distance 204 between eyelids of the eyes 200, which can be referred to as a degree of openness. The distance 204 between the eyelids can be employed in evaluating a degree of wakefulness of the user, a current emotional state of the user, a rapid change in emotional state of the user, and/or a degree of anxiety of the user. The occupant monitoring system 128 can continually monitor the user(s) and enable the evaluation of the emotional state and/or the anxiety level, as informed by image-based emotional mapping, as a function of the attributes 152 of a given road segment 148. For example, a convolutional neural network may be employed to analyze visual imagery collected by the occupant monitoring system 128. Such evaluation may be accomplished by the occupant monitoring system 128, the vehicle-based controller 28, the remote controller(s) 120, and/or the group identity database 124. The occupant monitoring system 128 can monitor how the user reacts to adjustments made to the climate comfort set-point(s) and enable the evaluation of how such adjustment was perceived (e.g., has anxiety level increased or decreased).

Figure 9:
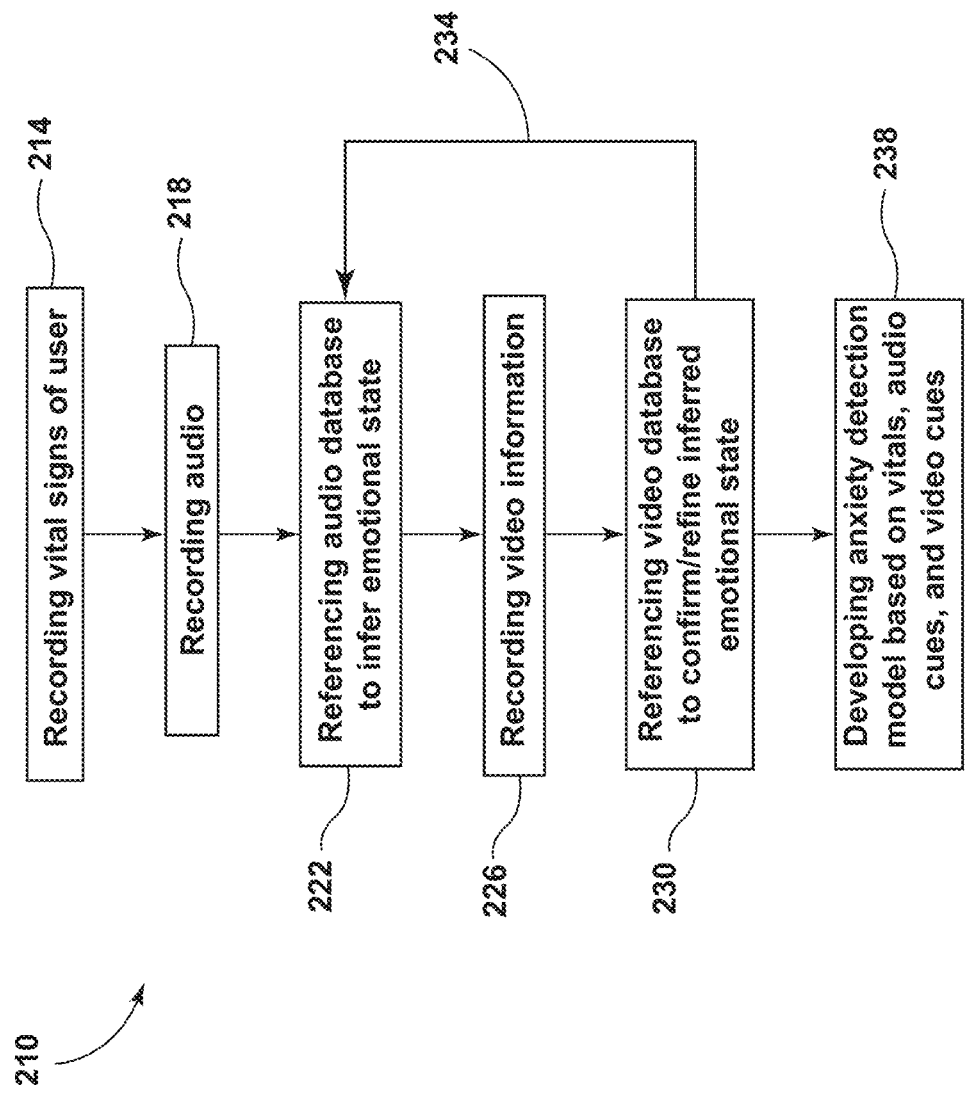
FIG. 9 is a flow diagram depicting a method for developing an anxiety detection model, according to one example.

Referring to FIG. 9, a method 210 of developing an anxiety detection model is depicted in exemplary form. The anxiety detection model depicted in the method 210 can be employed in determining the inferred degree of anxiety discussed herein. The method 210 may be continually executed during operation of the vehicle 20 such that the method 210 can be refined. The method 210 includes step 214 of recording vital signs of a user. The vital signs record at step 214 can include, but are not limited to, heartrate, blood pressure, respiration rate, and/or body temperature. The vital signs of the user may be collected by, for example, a heartrate monitor, a blood pressure monitor, a thermometer, a thermal imager, a camera, and/or an oxygen sensor. For example, the heartrate monitor, the blood pressure monitor, and the thermometer may be integrated into one or more wearable smart devices (e.g., smartwatch). The respiration rate may be monitored by the cabin-facing camera 176 and/or other imagers that have a field-of-view that focuses on the cabin 36. In such an example, a rising and falling of the user's chest and/or shoulders can be used as an indicator of respiration rate. Additionally, or alternatively, the one or more wearable smart devices may have an oxygen sensor incorporated therein that monitors oxygen levels within a bloodstream of the user. In some examples, oxygen sensors may be positioned proximate to each of the "known" seating positions and monitored for changes in oxygen concentration within the localized environment. In such an example, a rapid decrease in oxygen concentration may be tagged as a possible increase in respiration rate for the user seated nearest. Such an event may also be compared to user entry events into the cabin 36. By performing such a comparison, it may be possible to rule out such an event as an increase in respiration rate when a user has entered and occupied a "known" seating position that was vacant in the immediate past.

Referring again to FIG. 9, the method 210 also includes step 218 of recording audio within the cabin 36. The audio recorded at step 218 is then analyzed compared to an audio database. The audio database can be used to categorize a given audio recording with regard to an emotional state of the user from whom the audio was recorded. Accordingly, the method 210 can advance to step 222 of referencing the audio database to infer the emotional state of the user from whom the audio was recorded at step 218. The method 210 can also include step 226 of recording video information (e.g., with the cabin-facing camera 176). At step 230, the video information recorded at step 226 can be referenced against a video database in an effort to confirm and/or refine the inferred emotional state from step 222. The video database can be used to categorize a gesture and/or facial expression using image-based emotional mapping, as discussed above. The process outlined with regard to steps 222, 226, and 230 can be repeated in an iterative manner, as indicated by arrow 234. The method 210 may conclude with step 238 of developing an anxiety detection model based on the vital signs, audio cues, and video cues of a user of the vehicle 20. The developed anxiety detection model can be employed for the inferred degree of anxiety discussed herein.

Figure 10:
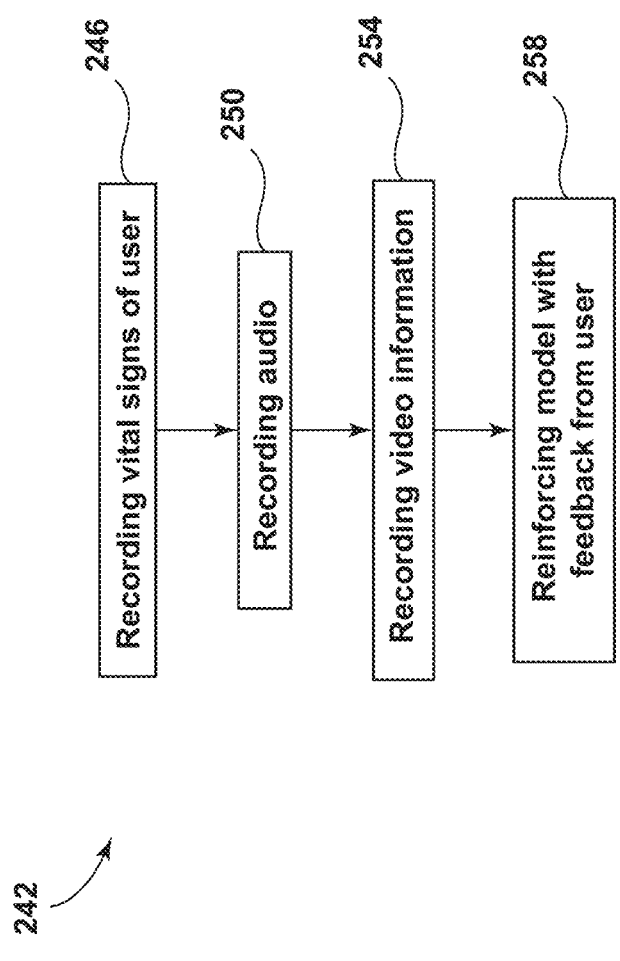
FIG. 10 is a flow diagram depicting a method for inferring a degree of anxiety of a user, according to one example.

Referring now to FIG. 10, a method 242 of inferring a degree of anxiety of a user is depicted in exemplary form. The method 242 can employ the developed anxiety detection model discussed with regard to method 210 in FIG. 9. The method 242 includes step 246 of recording the vital signs of the user. The method 242 also includes step 250 of recording audio within the cabin 36. The method 242 further includes step 254 of recording video information. Several parallels exist between method 210 and method 242. A distinction between methods 210 and 242 can be drawn with regard to developing a model versus applying and/or refining the model. In method 242, step 258 reinforces the developed anxiety detection model that was developed in method 210.

At step 258, the reinforcement of the developed anxiety detection model is provided in the form of feedback from the user. For example, the user may be asked to rate their current degree of anxiety. This user-provided data can be used to inform the refinement of the method 210 and/or the method 242. Similarly, the user may be asked if they would characterize their current emotional state as a particular emotion. That is, the feedback provided by the user may be qualitative and/or quantitative.

Figure 11:
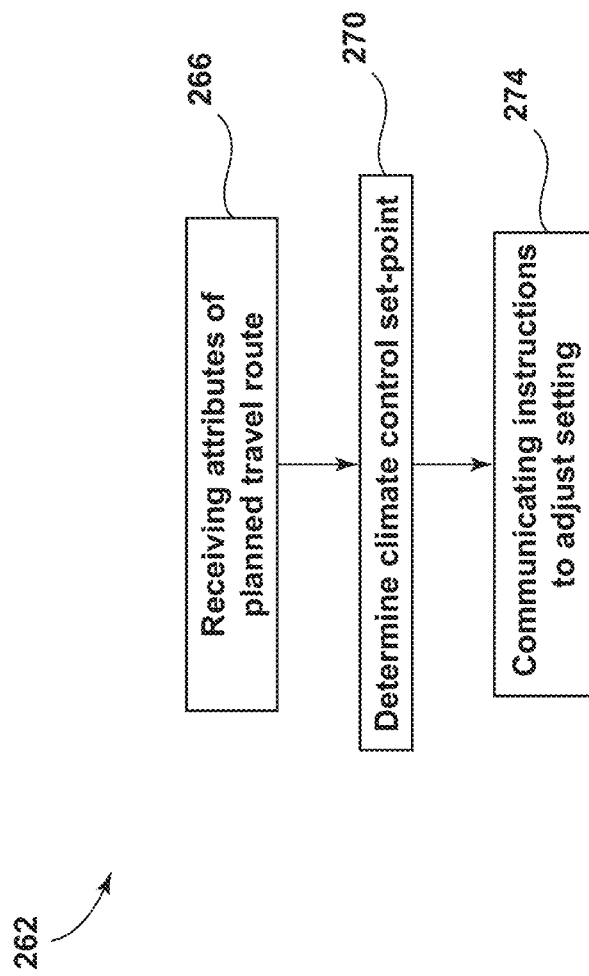
FIG. 11 is a flow diagram depicting a method for adjusting the cabin comfort setting of the vehicle, according to one example.

Referring to FIG. 11, a method 262 for adjusting a cabin comfort setting of the vehicle 20 is depicted in exemplary form. The method 262 includes step 266 of receiving the attributes 152 of a planned travel route. In some examples, the attributes 152 of the planned travel route can be provided by the vehicle-based controller 28. Alternatively, the attributes 152 of the planned travel route can be provided by one or more of the one or more remote controllers 120. The method 262 also includes step 270 of determining a climate control set-point based on the attributes 152 of the planned travel route. In various examples, the climate control set-point may be a temperature and/or a velocity of air delivered to the cabin 36. The method 262 further includes step 274 of communicating an instruction to adjust at least one setting chosen from the temperature of air delivered to the cabin 36 of the vehicle 20 and the velocity of air delivered to the cabin 36 of the vehicle 20. Said another way, step 274 communicates an instruction to adjust the temperature of air delivered to the cabin 36 of the vehicle 20 and/or the velocity of air delivered to the cabin 36 of the vehicle 20. It is contemplated that, in some examples, step 266, step 270, and/or step 274 can be executed on one or more of the one or more remote controllers 120. In such an example, the instructions communicated at step 274 can be received by the vehicle-based controller 28.

Referring again to FIG. 11, the method 262 can also include adjusting the at least one setting chosen from the temperature of air delivered to the cabin 36 of the vehicle 20 and the velocity of air delivered to the cabin 36 of the vehicle 20 to meet the determined climate control set-point. As discussed above, the velocity of the air delivered to the cabin 36 may be altered by adjusting a number of fans or blowers that are operating, adjusting a speed of the fans or blowers that are operating (e.g., adjusting a current and/or a voltage supplied to the fans or blowers), and/or adjusting features of the ductwork (e.g., an degree of openness for air outlet registers). In some examples, the method 262 can include obtaining demographic information of a user. In such an example, the method 262 can include referencing the group identity database 124, where the group identity database 124 includes demographic information from a user pool. The group identity database 124 can also include geographic information from the user pool. The method 262 can include grouping the user with an aligned cohort from the user pool based on the demographic information of the user. The method 262 can also include inferring a degree of anxiety of the user during the planned travel route based on the attributes of the planned travel route and data from the aligned cohort. Said another way, the inference of the degree of anxiety of the user during the planned travel route can be informed by the degree of anxiety indicated or measured for members of the aligned cohort during travel routes with similar attributes 152.

Referring further to FIG. 11, the method 262 can include refining the inferred degree of anxiety of the user by referencing a camera that monitors the face 188 of the user (e.g., the cabin-facing camera 176). Images captured by the camera can be evaluated within the method 262 by employing image-based emotional mapping. In various examples, the method 262 can additionally, or alternatively, group the user with an aligned cohort from the user pool based upon geographic information of the user. When the geographic information of the user is accounted for in grouping the user with the aligned cohort, the method 262 can include inferring a degree of anxiety of the user during the planned travel route based on the attributes 152 of the planned travel route and data from the aligned cohort. As discussed with regard to the demographic information above, the method 262 can include refining the inferred degree of anxiety of the user by referencing the camera that monitors the face 188 of the user (e.g., the cabin-facing camera 176). Images captured by the camera can be evaluated within the method 262 by employing image-based emotional mapping. It is contemplated that the aligned cohort based on geographic information may be different than the aligned cohort based on demographic information. In some examples, the aligned cohort can include individuals from the user pool that align with the demographic information of the user, as well as align with the geographic information of the user. That is, the aligned cohort may be represented as an overlap in a Venn diagram, where a first circle of the Venn diagram contains those individuals from the user pool that align with the geographic information of the user and a second circle of the Venn diagram contains individuals from the user pool that align with the demographic information of the user.

Referring still further to FIG. 11, the geographic information of the user can be determined by referencing a current location of the vehicle 20 when the vehicle 20 is equipped with the Global Positioning System (GPS) 32. Alternatively, a Global Positioning System (GPS) on the user's personal device may provide a current location of the user to a controller employed for execution of the method 262 (e.g., the vehicle-based controller 28 and/or one or more of the one or more remote controllers 120). In various examples, the step of adjusting at least one setting chosen from the temperature of air delivered to the cabin 36 of the vehicle 20 and the velocity of air delivered to the cabin of the vehicle 20 to meet the determined set-point can be executed by at least one controller. For example, the at least one controller can include a local controller of the vehicle 20 (e.g., the vehicle-based controller 28) and a controller of the user's personal mobile devices. More specifically, the step of adjusting at least one setting chosen from the temperature of air delivered to the cabin 36 of the vehicle 20 and the velocity of air delivered to the cabin of the vehicle 20 to meet the determined set-point can be executed by at least one processor. For example, the at least one processor can include a processor on the personal mobile device of the user and a local processor of the vehicle 20. In various examples, the at least one controller that executes the step of adjusting at least one setting chosen from the temperature of air delivered to the cabin 36 of the vehicle 20 and the velocity of air delivered to the cabin of the vehicle 20 to meet the determined set-point can apply a trained model to accomplish the step of determining a climate control set-point based on the attributes 152 of the planned travel route.

Figure 12:
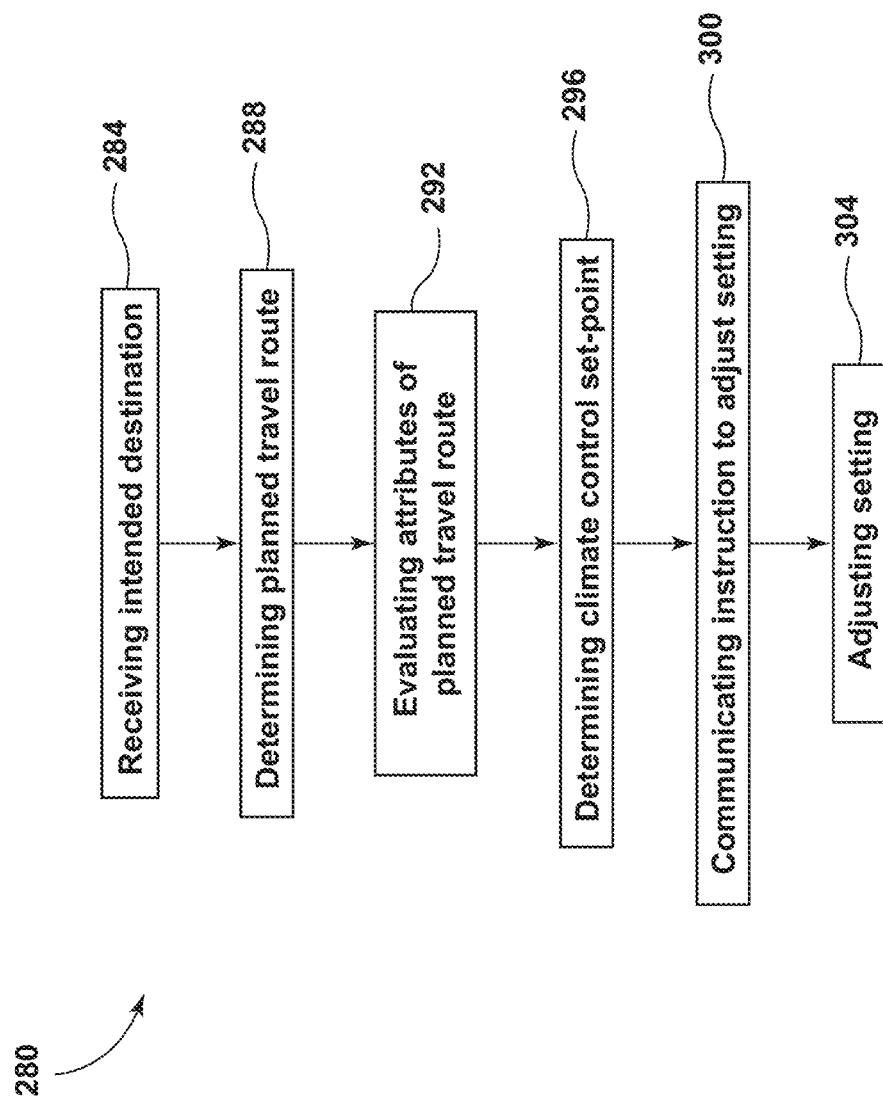
FIG. 12 is a flow diagram depicting a method for adjusting the cabin comfort setting of the vehicle, according to one example.

Referring now to FIG. 12, a method 280 for adjusting a cabin comfort setting of the vehicle 20 is depicted in exemplary form. The method 280 includes step 284 of receiving an intended destination from a user. Next, the method 280 advances to step 288 of determining a planned travel route from a current location to the intended destination. The planned travel route can be determined by a Global Positioning System (GPS), such as the Global Positioning System (GPS) 32 provided on the vehicle 20, a Global Positioning System (GPS) that is provided on a personal mobile device of the user, and/or a Global Positioning System (GPS) that is accessible by one or more of the one or more remote controllers 120. The method 280 also includes step 292 of evaluating the attributes 152 of the planned travel route. The attributes 152 of the planned travel route can be evaluated by the vehicle-based controller 28 and/or one or more of the one or more remote controllers 120. The method 280 further includes step 296 of determining a climate control set-point based on the attributes 152 of the planned travel route, as discussed above. The method 280 also includes step 300 of communicating an instruction to adjust at least one setting chosen from the temperature of air delivered to the cabin 36 of the vehicle 20 and the velocity of air delivered to the cabin 36 of the vehicle 20. The communicated instruction of step 300 may be received by the vehicle-based controller 28. In some examples, the method 280 may conclude with step 304 of adjusting the at least one setting chosen from the temperature of air delivered to the cabin 36 of the vehicle 20 and the velocity of air delivered to the cabin 36 of the vehicle 20 to meet the determined set-point.

Referring again to FIG. 12, in various examples, the method 280 can include obtaining demographic information from the user. The demographic information obtained from the user can include, but is not limited to, age, sex, gender, and/or race. The method 280 can include referencing the group identity database 124, where the group identity database includes demographic information from a user pool and geographic information from the user pool. Accordingly, the method 280 may include grouping the user with an aligned cohort from the user pool based on the demographic information of the user. The method can also include inferring a degree of anxiety of the user during the planned travel route based on the attributes 152 of the planned travel route and data from the aligned cohort. The inferred degree of anxiety of the user can be employed in the step 296 of determining a climate control set-point based on the attributes 152 of the planned travel route. In some examples, the method 280 can include refining the aligned cohort from the user pool based on geographic information of the user. The current location of the user can provide the geographic information of the user. In various examples, the method 280 can include inferring a degree of anxiety of the user during the planned travel route based on the attributes 152 of the planned travel route and data from the refined aligned cohort. Similar to the above discussion with regard to method 262, the step 304 of adjusting at least one setting chosen from a temperature of air delivered to the cabin 36 of the vehicle 20 and a velocity of air delivered to the vehicle to meet the determined set-point can be executed by at least one controller. In other words, the methods discussed herein may be executed on a single controller or the methods discussed herein may be executed on a plurality of controllers. For example, a first portion of a given method may be executed on a first controller and a second portion of the given method may be executed on a second controller, where the first portion and the second portion contain an entirety of the given method.

Figure 13:
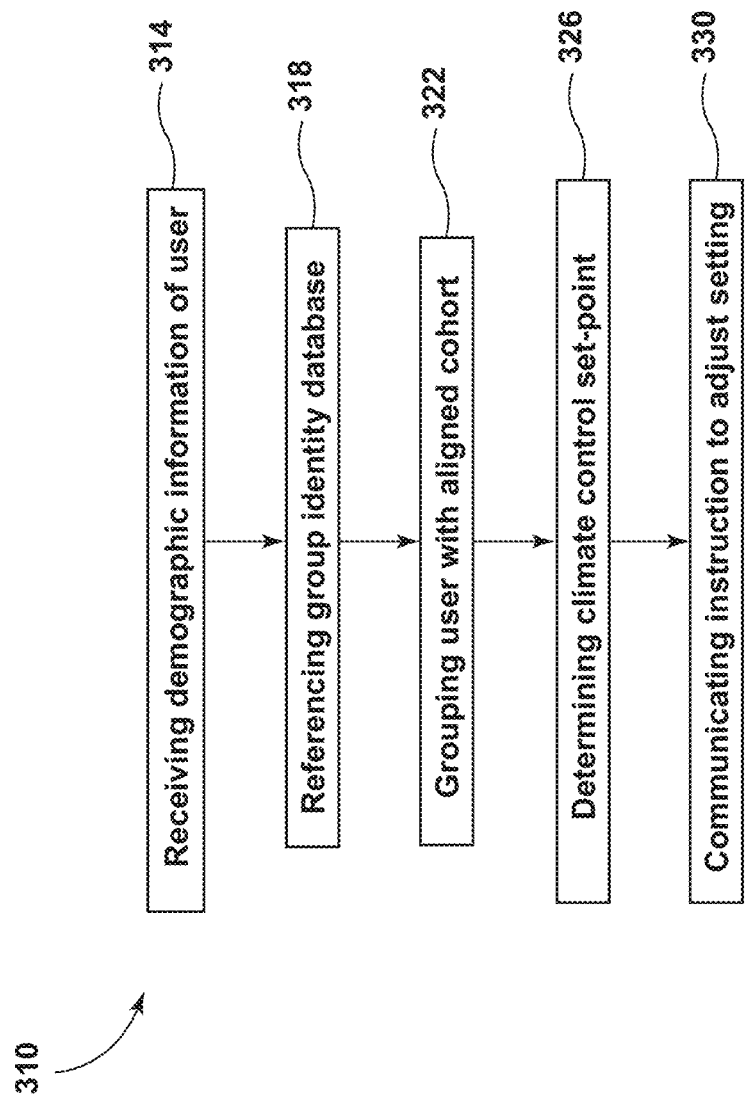
FIG. 13 is a flow diagram depicting a method for adjusting the cabin comfort setting of the vehicle, according to one example.

Referring to FIG. 13, a method 310 for adjusting a cabin comfort setting of the vehicle 20 includes step 314 of receiving demographic information of a user. The method 310 also includes step 318 of referencing the group identity database 124, where the group identity database 124 includes demographic information from a user pool. The method 310 further includes step 322 of grouping the user with an aligned cohort from the user pool based on the demographic information of the user. Additionally, the method 310 includes step 326 of determining a climate control set-point based on data from the aligned cohort. Further, the method 310 includes step 330 of communicating an instruction to adjust at least one setting chosen from the temperature of air delivered to the cabin 36 of the vehicle 20 and the velocity of air delivered to the cabin 36 of the vehicle 20.

Referring again to FIG. 13, the method 310 can include adjusting the at least one setting chosen from the temperature of air delivered to the cabin 36 of the vehicle 20 and the velocity of the air delivered to the cabin 36 of the vehicle 20 to meet the determined climate control set-point. The method 310 can include monitoring adjustments made to the climate control set-point that are made by the user following execution of the step of adjusting the at least one setting chosen from the temperature of air delivered to the cabin 36 of the vehicle 20 and the velocity of air delivered to the cabin 36 of the vehicle 20 to meet the determined climate control set-point. The method 310 can include refining the aligned cohort in response to detecting an adjustment made to the climate control set-point by the user. In some examples, the method 310 can include updating the group identity database 124 in response to detecting an adjustment made to the climate control set-point by the user. In various examples, the aligned cohort and the user may have at least one characteristic in common chosen from a number of passengers within the cabin 36, a number of rows of seats within the cabin 36, age, gender, sex, race, etc. Said another way, the aligned cohort and the user may fall into the same category with regard to a number of passengers within the cabin 36, a number of rows of seats within the cabin 36, age, gender, sex, and/or race. In some examples, the method 310 includes receiving geographic information of the user. The method 310 can also include referencing the group identity database 124, where the group identity database 124 includes geographic information from the user pool. In various examples, the method 310 can include refining the aligned cohort based on the geographic information of the user.

Figure 14:
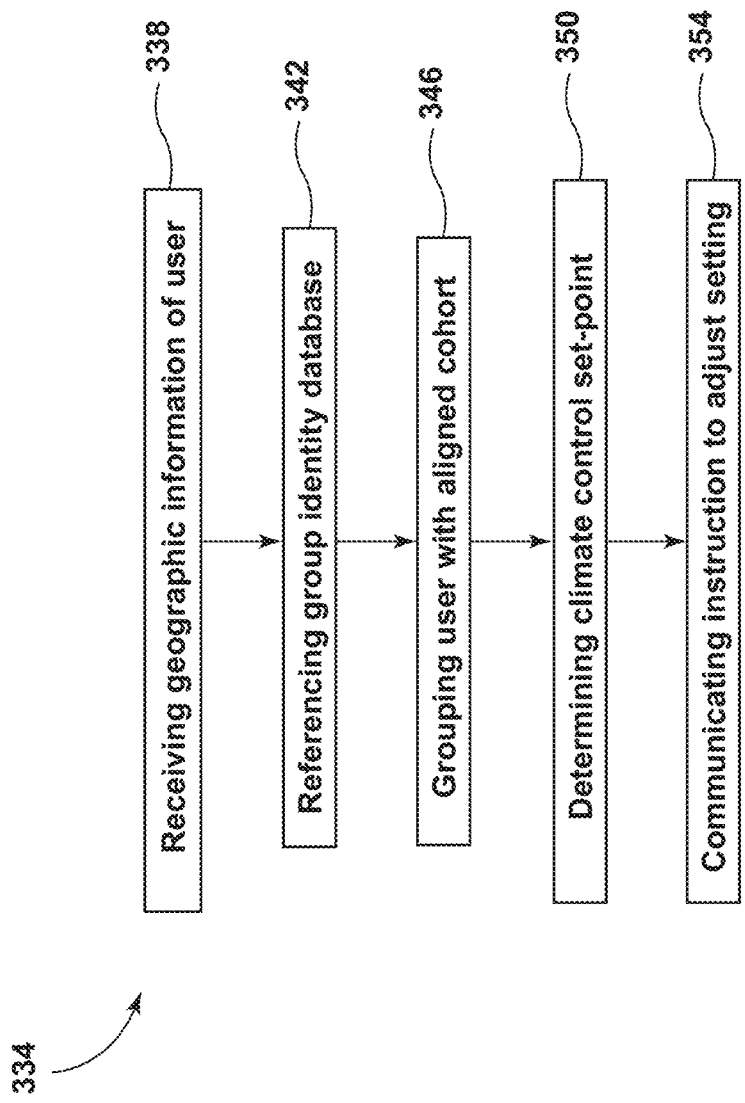
FIG. 14 is a flow diagram depicting a method for adjusting the cabin comfort setting of the vehicle, according to one example.

Referring now to FIG. 14, a method 334 for adjusting a cabin comfort setting of the vehicle 20 includes step 338 of receiving geographic information of a user. The method 334 also includes step 342 of referencing the group identity database 124, where the group identity database 124 includes geographic information from a user pool. The method 334 further includes step 346 of grouping the user with an aligned cohort from the user pool based on the geographic information of the user. Additionally, the method 334 includes step 350 of determining a climate control set-point based on data from the aligned cohort. Further, the method 334 includes step 354 of communicating an instruction to adjust at least one setting chosen from the temperature of air delivered to the cabin 36 of the vehicle 20 and the velocity of air delivered to the cabin 36 of the vehicle 20.

Referring again to FIG. 14, the method 334 can include adjusting the at least one setting chosen from the temperature of air delivered to the cabin 36 of the vehicle 20 and the velocity of the air delivered to the cabin 36 of the vehicle 20 to meet the determined climate control set-point. The method 334 can include monitoring adjustments made to the climate control set-point that are made by the user following execution of the step of adjusting the at least one setting chosen from the temperature of air delivered to the cabin 36 of the vehicle 20 and the velocity of air delivered to the cabin 36 of the vehicle 20 to meet the determined climate control set-point. The method 334 can include refining the aligned cohort in response to detecting an adjustment made to the climate control set-point by the user. In some examples, the method 334 can include updating the group identity database 124 in response to detecting an adjustment made to the climate control set-point by the user. In various examples, the aligned cohort and the user may have at least one characteristic in common chosen from a number of passengers within the cabin 36, a number of rows of seats within the cabin 36, age, gender, sex, race, etc. Said another way, the aligned cohort and the user may fall into the same category with regard to a number of passengers within the cabin 36, a number of rows of seats within the cabin 36, age, gender, sex, and/or race. In some examples, the method 334 includes receiving demographic information of the user. The method 334 can also include referencing the group identity database 124, where the group identity database 124 includes demographic information from the user pool. In various examples, the method 334 can include refining the aligned cohort based on the demographic information of the user.

Figure 15:
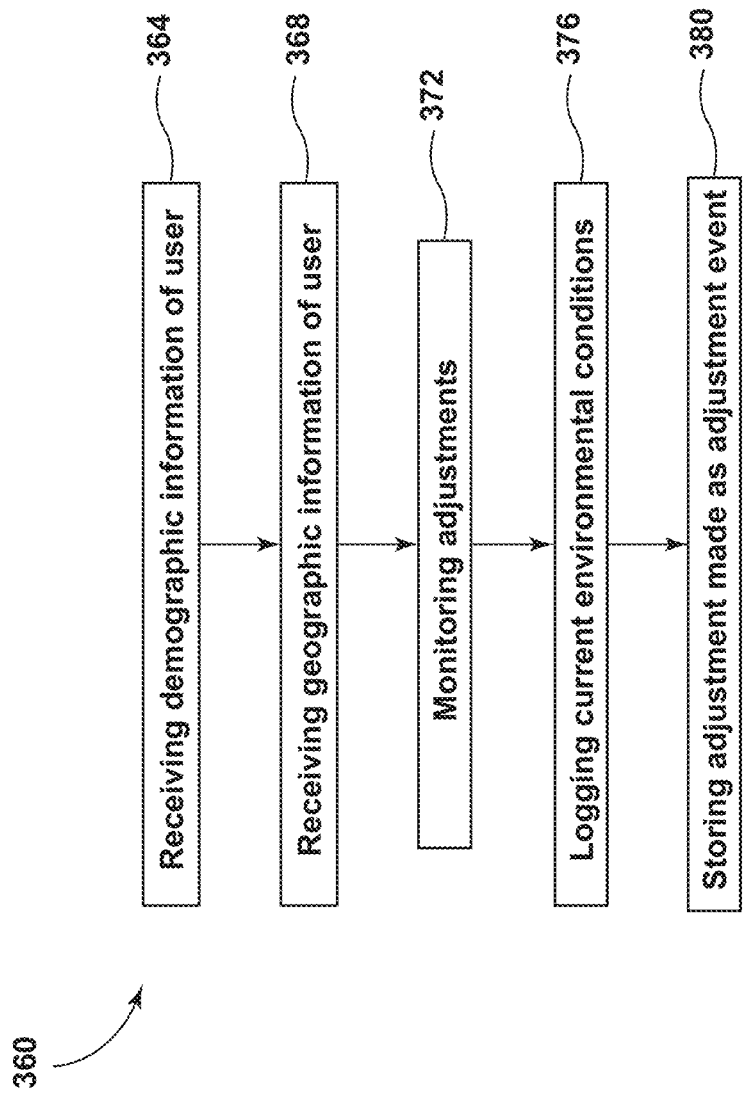
FIG. 15 is a flow diagram depicting a method for developing a group identity database, according to one example.

Referring to FIG. 15, a method 360 for developing the group identity database 124 is depicted in exemplary form. The method 360 includes step 364 of receiving demographic information of a user. The method 360 also includes step 368 of receiving geographic information of the user. The method 360 further includes step 372 of monitoring adjustments made to the climate control system 24 of the vehicle 20 by the user. The method 360 also includes step 376 of logging current environmental conditions exterior to the vehicle 20. For example, the current environmental conditions exterior to the vehicle 20 that are logged at step 376 can include, but are not limited to, a temperature, a humidity, whether precipitation is present, and/or a brightness (e.g., to estimate degree of cloud cover and/or day vs. night). The method 360 also includes step 380 of storing an adjustment made to the climate control system 24 as an adjustment event. The adjustment event can be tagged with the demographic information of the user, the geographic information of the user, the current environmental conditions exterior to the vehicle 20, and/or an adjustment category. The adjustment category can be a set-point of the climate control system 24 (e.g., velocity of air delivered to the cabin 36, temperature of air delivered to the cabin 36, etc.).

Referring again to FIG. 15, the method 360 can also include applying a machine learning model that is trained to evaluate demographic information and geographic information of a user pool and group the user with an aligned cohort of individuals from the user pool that have chosen similar setting of the climate control system 24 in environmental conditions that are similar to the current environmental conditions exterior to the vehicle 20. In some examples, the method 360 can include determining identifying characteristics of the aligned cohort and the user. The method 360 can also include establishing a group identity based on the identifying characteristics.

Figure 16:
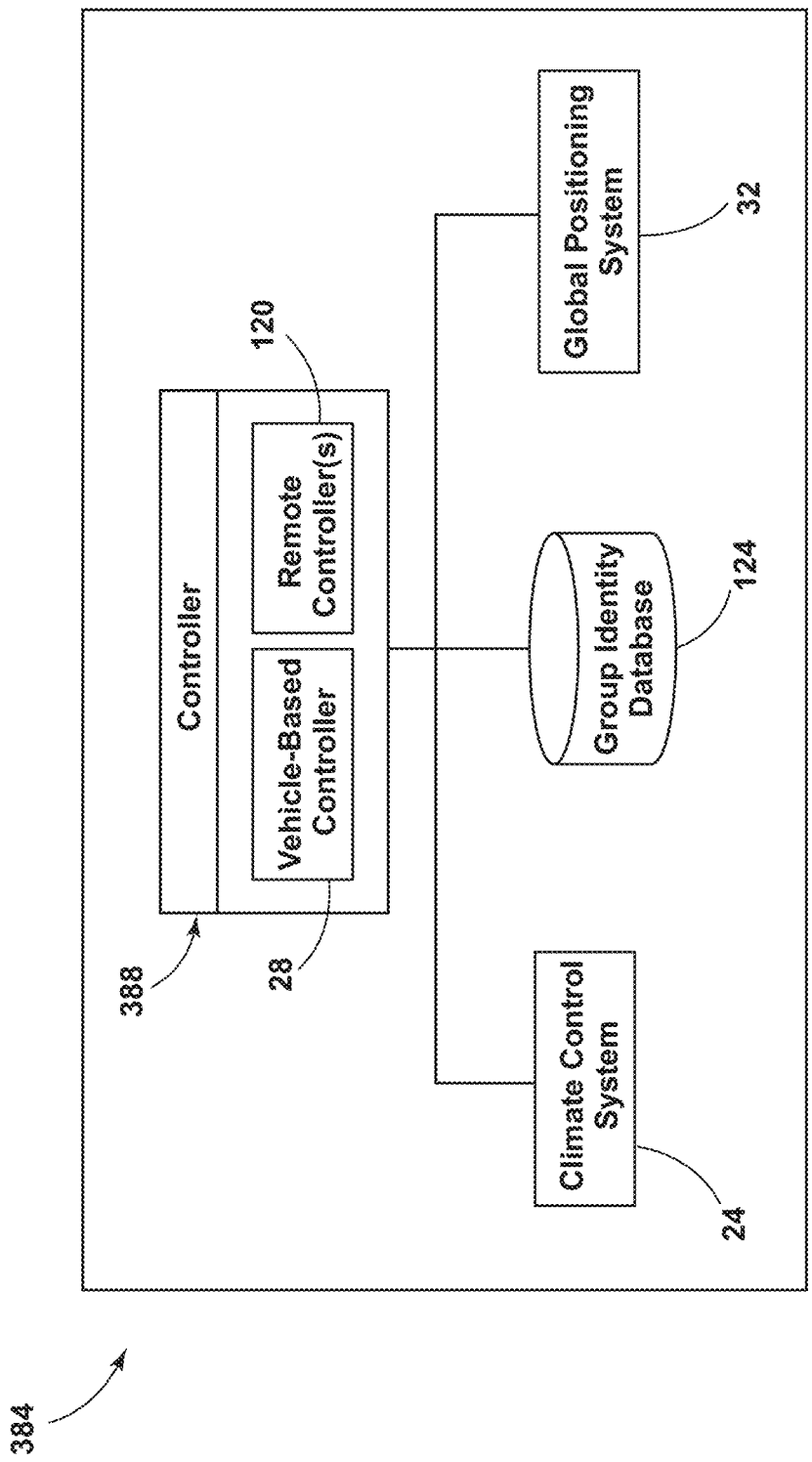
FIG. 16 is a schematic representation of a system for adjusting the cabin comfort setting of the vehicle, according to one example.

Referring now to FIG. 16, a system 384 for adjusting a cabin comfort setting of the vehicle 20 is depicted in exemplary form. The system 384 includes the climate control system 24. The climate control system 24 can adjust a temperature of air delivered to the cabin 36 of the vehicle 20 (e.g., by use of the heat pump 38). The climate control system 24 can also adjust a velocity of air delivered to the cabin 36 of the vehicle 20. The system 384 also includes the Global Positioning System (GPS) 32. The Global Positioning System (GPS) 32 provides geographic information (e.g., to the vehicle-based controller 28 and/or one or more of the one or more remote controllers 120). The system 384 further includes the group identity database 124. Additionally, the system 384 includes at least one controller 388. The at least one controller 388 can include, but is not limited to, the vehicle-based controller 28 and/or one or more of the one or more remote controllers 120.

Referring again to FIG. 16, the at least one controller 388 receives an intended destination from the user. The at least one controller 388 also determines, by way of the Global Positioning System (GPS) 32, a planned travel route from a current location to the intended location. The at least one controller 388 further evaluates the attributes 152 of the planned travel route. Additionally, the at least one controller 388 determines a climate control set-point based on the attributes 152 of the planned travel route. Further, the at least one controller 388 communicates an instruction to adjust at least one setting chosen from a temperature of air delivered to the cabin 36 of the vehicle 20 and a velocity of air delivered to the cabin 36 of the vehicle 20. For example, one of the one or more remote controllers 120 can communicate the instruction to adjust at least one setting chosen from a temperature of air delivered to the cabin 36 of the vehicle 20 and a velocity of air delivered to the cabin 36 of the vehicle 20 to the vehicle-based controller 28. The at least one controller 388 also adjusts the at least one setting chosen from the temperature of air delivered to the cabin 36 of the vehicle 20 and the velocity of air delivered to the cabin 36 of the vehicle 20 to meet the determined set-point.

Referring further to FIG. 16, in some examples, the at least one controller 388 obtains demographic information of the user. In various examples, the at least one controller 388 references the group identity database 124, where the group identity database 124 includes demographic information from a user pool and geographic information from the user pool. The at least one controller 388 can also group the user with an aligned cohort from the user pool based on the demographic information of the user. The at least one controller 388 can infer a degree of anxiety of the user during the planned travel route based on the attributes 152 of the planned travel route and data from the aligned cohort. In various examples, the at least one controller 388 can refine the aligned cohort from the user pool based on the geographic information of the user. The geographic information of the user can be determined by referencing the current position provided by the Global Positioning System (GPS) 32. The at least one controller 388 can also infer the degree of anxiety of the user during the planned travel route based on the attributes 152 of the planned travel route and data from the refined cohort.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A method for adjusting a cabin comfort setting of a vehicle, the method comprising:
receiving via a controller demographic information of a user through an occupant monitoring system configured to identify nodal points on a face of the user;
referencing with the controller a group identity database, wherein the group identity database comprises demographic information from a user pool;
grouping the user with an aligned cohort from the user pool using the controller based upon the demographic information of the user;
determining a climate control set-point with the controller based upon data from the aligned cohort;
communicating via the controller an instruction to adjust at least one setting chosen from a temperature of air delivered to a cabin of the vehicle and a velocity of air delivered to the cabin of the vehicle;
adjusting the at least one setting chosen from a temperature of air delivered to a cabin of the vehicle and a velocity of air delivered to the cabin of the vehicle to meet the determined climate control set-point;
monitoring with the controller adjustments made to the climate control set-point made by the user following execution of the step of adjusting the at least one setting chosen from a temperature of air delivered to a cabin of the vehicle and a velocity of air delivered to the cabin of the vehicle to meet the determined climate control set-point; and
updating the group identity database with the controller in response to detecting an adjustment made to the climate control set-point by the user.

2. The method for adjusting a cabin comfort setting of a vehicle of claim 1, further comprising:
refining the aligned cohort with the controller in response to detecting an adjustment made to the climate control set-point by the user.

3. The method for adjusting a cabin comfort setting of a vehicle of claim 1, wherein the aligned cohort and the user have at least one characteristic in common chosen from a number of passengers within the cabin, a number of rows of seats within the cabin, age, gender, and race.

4. The method for adjusting a cabin comfort setting of a vehicle of claim 1, further comprising:
receiving geographic information of the user; and
referencing the group identity database, wherein the group identity database further comprises geographic information from the user pool.

5. The method for adjusting a cabin comfort setting of a vehicle of claim 4, further comprising:
refining the aligned cohort with the controller based upon based upon the geographic information of the user.

6. A method for adjusting a cabin comfort setting of a vehicle, the method comprising:
receiving via a controller geographic information of a user through a global positioning system employed by a controller to classify road segments along a travel route;
referencing with the controller a group identity database, wherein the group identity database comprises geographic information from a user pool;
grouping the user with an aligned cohort from the user pool using the controller based upon the geographic information of the user;
determining a climate control set-point with the controller based upon data from the aligned cohort;
communicating via the controller an instruction to adjust at least one setting chosen from a temperature of air delivered to a cabin of the vehicle and a velocity of air delivered to the cabin of the vehicle;
adjusting the at least one setting chosen from a temperature of air delivered to a cabin of the vehicle and a velocity of air delivered to the cabin of the vehicle to meet the determined climate control set-point;
monitoring with the controller adjustments made to the climate control set-point made by the user following execution of the step of adjusting the at least one setting chosen from a temperature of air delivered to a cabin of the vehicle and a velocity of air delivered to the cabin of the vehicle to meet the determined climate control set-point; and
updating the group identity database with the controller in response to detecting an adjustment made to the climate control set-point by the user.

7. The method for adjusting a cabin comfort setting of a vehicle of claim 6, further comprising:
refining the aligned cohort with the controller in response to detecting an adjustment made to the climate control set-point by the user.

8. The method for adjusting a cabin comfort setting of a vehicle of claim 6, further comprising:
receiving demographic information of the user through an occupant monitoring system configured to identify nodal points on a face of the user; and
referencing the group identity database, wherein the group identity database further comprises demographic information from the user pool.

9. The method for adjusting a cabin comfort setting of a vehicle of claim 8, further comprising:
refining the aligned cohort based upon based upon the demographic information of the user.

10. The method for adjusting a cabin comfort setting of a vehicle of claim 9, wherein the aligned cohort and the user have at least one characteristic in common chosen from a number of passengers within the cabin, a number of rows of seats within the cabin, age, gender, and race.

11. A method for developing a group identity database and adjusting a cabin comfort setting of a vehicle, the method comprising:
receiving via a controller demographic information of a user though an occupant monitoring system configured to identify nodal points on a face of the user;
receiving geographic information of the user;
monitoring with the controller adjustments made to a climate control system of the vehicle by the user;
logging current environmental conditions exterior to the vehicle;
storing via the controller an adjustment made to the climate control system as an adjustment event, wherein the adjustment event is tagged with the demographic information of the user, the geographic information of the user, the current environmental conditions exterior to the vehicle, and an adjustment category, and wherein the adjustment category is a set-point of the climate control system;
adjusting at least one setting chosen from a temperature of air delivered to the cabin of the vehicle and a velocity of air delivered to the cabin of the vehicle to meet the set-point of the climate control system;
monitoring with the controller adjustments made to the climate control set-point made by the user following execution of the step of the at least one setting chosen from a temperature of air delivered to a cabin of the vehicle and a velocity of air delivered to the cabin of the vehicle to meet the determined climate control set-point; and
updating the group identity database with the controller in response to detecting an adjustment made to the climate control set-point by the user.

12. The method of claim 11, wherein the set-point is at least one setting chosen from a temperature of air delivered to a cabin of the vehicle and a velocity of air delivered to the cabin of the vehicle.

13. The method of claim 11, further comprising:
applying a machine learning model executed by the controller that is trained to evaluate demographic information and geographic information of a user pool and group the user with an aligned cohort of individuals from the user pool that have chosen similar settings of the climate control system in environmental conditions that are similar to the current environmental conditions exterior to the vehicle.

14. The method of claim 13, further comprising:
determining identifying characteristics of the aligned cohort and the user; and
establishing a group identity based upon the identifying characteristics.

\* \* \* \* \*

UNITED STATES PATENT AND TRADEMARK OFFICE
CERTIFICATE OF CORRECTION

| | | |
|---|---|---|
| PATENT NO. | : 12,134,301 B2 | Page 1 of 1 |
| APPLICATION NO. | : 17/504864 | |
| DATED | : November 5, 2024 | |
| INVENTOR(S) | : Ostrowski et al. | |

It is certified that error appears in the above-identified patent and that said Letters Patent is hereby corrected as shown below:

In the Claims

Column 22:
Claim 11, Line 50:
After "of" (second occurrence) insert --adjusting--.

Signed and Sealed this
Thirty-first Day of December, 2024

Derrick Brent
*Acting Director of the United States Patent and Trademark Office*